(12) United States Patent
Chitilian et al.

(10) Patent No.: US 10,559,000 B2
(45) Date of Patent: Feb. 11, 2020

(54) ADVERTISER CAMPAIGN SCRIPT EXECUTION MANAGEMENT

(75) Inventors: Varouj A. Chitilian, San Francisco, CA (US); Ilya Netchitailo, Mountain View, CA (US); Nikhil Bakshi, Mountain View, CA (US); Jiaqi Yu, Hayward, CA (US); Chetan Patel, Fremont, CA (US)

(73) Assignee: Google LLC, Mountain View, CA (US)

(*) Notice: Subject to any disclaimer, the term of this patent is extended or adjusted under 35 U.S.C. 154(b) by 1566 days.

(21) Appl. No.: 13/474,391

(22) Filed: May 17, 2012

(65) Prior Publication Data

US 2018/0136975 A1    May 17, 2018

Related U.S. Application Data

(60) Provisional application No. 61/525,459, filed on Aug. 19, 2011, provisional application No. 61/555,092, filed on Nov. 3, 2011, provisional application No. 61/555,086, filed on Nov. 3, 2011, provisional application No. 61/555,068, filed on Nov. 3, 2011, provisional application No. 61/555,071, filed on Nov. 3, 2011.

(51) Int. Cl.
| | |
|---|---|
| G06F 9/46 | (2006.01) |
| G06Q 30/02 | (2012.01) |
| G06F 9/54 | (2006.01) |
| G06F 9/448 | (2018.01) |
| G06F 9/50 | (2006.01) |
| G06Q 10/06 | (2012.01) |

(52) U.S. Cl.
CPC ......... *G06Q 30/0242* (2013.01); *G06F 9/448* (2018.02); *G06F 9/46* (2013.01); *G06F 9/5005* (2013.01); *G06F 9/541* (2013.01); *G06F 9/542* (2013.01); *G06F 9/547* (2013.01); *G06Q 10/06* (2013.01); *G06Q 30/0243* (2013.01); *G06Q 30/0244* (2013.01); *G06Q 30/0251* (2013.01); *G06Q 30/0263* (2013.01); *G06Q 30/0277* (2013.01)

(58) Field of Classification Search
CPC .................................. G06Q 30/0207–30/0277
USPC ....................................................... 705/14.61
See application file for complete search history.

(56) References Cited

U.S. PATENT DOCUMENTS

| | | | |
|---|---|---|---|
| 2002/0062157 A1* | 5/2002 | Sugimoto et al. | 700/14 |
| 2005/0097560 A1* | 5/2005 | Rolia et al. | 718/104 |
| 2008/0077504 A1* | 3/2008 | Gausebeck et al. | 705/26 |
| 2008/0235065 A1* | 9/2008 | Dan et al. | 705/5 |
| 2009/0282411 A1* | 11/2009 | Carteri et al. | 718/102 |

(Continued)

OTHER PUBLICATIONS

Internet Archive Way Back Machine, Understand at, atq, atrm, batch Commands using 9 Examples, URL capture date of Jun. 18, 2010 from URL: http://www.thegeekstuff.com/2010/06/at-atq-atrm-batch-command-examples, The Geek Stuff.*

(Continued)

Primary Examiner — Kiersten V Summers
(74) Attorney, Agent, or Firm — Fish & Richardson P.C.

(57) ABSTRACT

Methods, systems, and apparatus, including computer programs encoded on a computer storage medium, for automated management of campaigns using scripted rules, and managing the execution of the rules.

26 Claims, 14 Drawing Sheets

(56) References Cited

U.S. PATENT DOCUMENTS

2011/0040824 A1   2/2011   Harm

OTHER PUBLICATIONS

Internet Archive Way Back Machine, unix at command, URL capture date of Sep. 13, 2010 from URL: http://www.softpanorama.org/Utilities/at.shtml, Softpanorama.*
The Free Dictionary—American Hertiage Dictionary of the English Language, Difference, Nov. 30, 2016, Houghton Mifflin Harcourt, fifth editiion.*
U.S. Appl. No. 12/764,501, filed Apr. 21, 2010, Tracking Changes in On-Line Spreadsheet, Chitilian et al.
"Campaign Management" PCC Campaign Management (Pay Per Click) Paid Search [online]. [Retrieved on May 4, 2012]. Retrieved from Internet electronic mail: http://www.marinsoftware.com/products/campaign-management, 1 page.
"Kenshoo Enterprise" Kenshoo [online]. Copyright 2012. [Retrieved on May 4, 2012]. Retrieved from Internet electronic mail: http://www.kenshoo.com/Enterprise, 2 pages.
"Kenshoo Portfolio Optimizer" Kenshoo [online]. [Retrieved on May 4, 2012]. Retrieved from Internet electronic mail: http://www.kenshoo.com/imgs/RealTime_Campaigns.pdf, 3 pages.
"Kenshoo Editor 2.0" Kenshoo [online]. [Retrieved on May 4, 2012]. Retrieved from Internet electronic mail: http://www.kenshoo.com/imgs/Kenshoo_Editor_Brochure.pdf, 1 page.
"RealTime CampaignsTM" Kenshoo [online]. [Retrieved on May 4, 2012]. Retrieved from Internet electronic mail: http://www.kenshoo.com/imgs/Kenshoo_Editor_Brochure.pdf, 1 pages.
"Kenshoo Universal Platform" Kenshoo [online]. [Retrieved on May 4, 2012]. Retrieved from Internet electronic mail: http://www.kenshoo.com/imgs/Kenshoo_Universal_Platform_Brochure.pdf, 2 pages.
"Kenshoo and Criteo Partnership Results in Stronger Insights & Performance Across Search & Retargeting" Kenshoo [online]. [Retrieved on May 4, 2012]. Retrieved from Internet electronic mail: http://www.kenshoo.com/imgs/Kenshoo_Retargeting_Case_Study.pdf, 1 page.
"Retargeting: Kenshoee + Criteo" Kenshoo [online]. [Retrieved on May 4, 2012]. Retrieved from Internet electronic mail: http://www.kenshoo.com/imgs/Kenshoo_Retargeting_Brochure.pdf, 1 page.
"Solutions for Advertisers" Clickable [online] [Retrieved on May 4, 2012]. Retrieved from Internet electronic mail: http://www.clickable.com/advertising-solutions/default.aspx, 2 pages.
"Optimization Platform" Adobe, Efficient Frontier [online]. [Retrieved on May 14, 2012]. Retrieved from the Internet electronic mail: http://www.efrontier.com/innovation/optimization-platform, 5 pages.

* cited by examiner

Campaign:Stamp Classes> Ad Group:Cards — 202

| Settings | Ads | Keywords | Networks | Audiences | Ad extensions |

All but deleted keywords ▼

These keywords refine search.

+ Add keywords | Edit ▼ | Change status... ▼ | See search terms... ▼ | Alerts ▼ | 🔍 ⬇

| | Keyword | Status ⓘ | Max. CPC | Clicks | Impr |
|---|---|---|---|---|---|
| ● | stamping classes | ▢ Eligible | $1.00 ☑ | 0 | |
| ● | stampin up classes | ▢ Eligible | $1.00 ☑ | 0 | |
| ● | stamp classes | ▢ Eligible | $1.00 ☑ | 0 | |
| ⊟ | rubber stamps cardmaking | ▢ Paused | $0.99 ☑ | 0 | |
| ● | rubber stamping classes | ▢ Eligible | $1.00 ☑ | 0 | |
| ● | rubber stamping class | ▢ Eligible | $1.00 ☑ | 0 | |
| ● | rubber stamp classes | ▢ Eligible | $1.00 ☑ | 0 | |
| ● | cardmaking classes | ▢ Eligible | $1.00 ☑ | 0 | |

— 208 / 210 / 212 ▲

Run existing rule

- Create rule for keywords — 214
- Pause keywords when...
- Change max CPC bids when...
- Raise bids to first page CPC
- Create rule for ad groups — 216
- Pause ad group when...
- Change ad group default max. CPC when...
- Create rule for campaigns — 218
- Pause campaign when...
- Change daily budget when...
- Custom rules » — 220
- Manage rules » — 222

Automated rules

Automated rules can save you time by making changes to your account based on criteria you specify. Learn how to create rules, and see examples of popular rules. Rules aren't guaranteed to run in some cases, so we recommend regularly monitoring the rules you set up. Learn more.

All but deleted / past rules ▾

Change status ▾

| ☐ Status ⓘ | Rule name | Created by | Frequency | Description | Email notifications | Actions ⓘ |
|---|---|---|---|---|---|---|
| ☐ ✦ | Change max CPC bids | User 1 | Daily at 08 AM<br>Using data from Previous day | Increase bid by 10%<br>Max bid $10.00<br>Requirements: CTR < 2.00%<br>Campaign #1 > Ad Group #1 > All but deleted keywords | No emails | Edit rule |
| ☐ ✦ | Change max CPC bids 2 | User 1 | Daily at 08 AM<br>Using data from Previous day | Increase bid by 8%<br>Max bid $10.00<br>Requirements: CTR < 2.00%<br>Campaign #1 > Ad Group #1 > All but deleted keywords | No emails | Edit rule |

Show rows: 50 ▾  1-2 of 2

Rule Change max. CPC bids 2 conflicts with rule Change max. CPC bids
Bids for the same keywords will be changed by both rules
You can Accept the rules as they are, or modify the rules to resolve the conflict.

ADVERTISER CAMPAIGN SCRIPT EXECUTION MANAGEMENT

This application claims the benefit under 35 U.S.C. § 119(e) of U.S. Patent Application No. 61/525,459, entitled "Advertiser Campaign Scripting," filed Aug. 19, 2011; U.S. Patent Application No. 61/555,092, entitled "Advertiser Campaign Script Execution Management," filed Nov. 3, 2011; U.S. Patent Application No. 61/555,086, entitled "Advertiser Service Scripting," filed Nov. 3, 2011; U.S. Patent Application No. 61/555,068, entitled "Application Program Interface Script Caching And Batching," filed Nov. 3, 2011; and U.S. Patent Application No. 61/555,071, entitled "Advertising Campaign Script Execution Management," filed Nov. 3, 2011; the disclosures of which are incorporated herein by reference in their entirety.

BACKGROUND

This specification relates on-line advertising.

The Internet enables access to a wide variety of content items, e.g., video and/or audio files, web pages for particular subjects, news articles, etc. Such access to these content items likewise enables opportunities for targeted advertising. For example, advertisements can be provided with search results in response to a search query provided by a user; provided for web pages of third party online publishers that have content related to the advertisement; or provided in response to a specific request from a user, such as when a user requests information for particular products or services.

An advertising management system can be used to facilitate the value exchange between advertisers and publishers. Advertisers provide advertisements, specify targeting criteria for ad campaigns, and offer bids for the opportunities to have their advertisements presented on publishers' webpages. Online advertisers use advertising management tools to manage their advertising campaigns. These management tools include an account interface that allows an advertiser to create and define various aspects of advertising campaigns and ad groups, such as keywords, targeting criteria, budgets, bids for ad placement, duration, different types of advertisements, and so on. After the advertiser has specified the campaign and ad group data and activated the advertising campaigns and/or ad groups, advertisements can be dynamically selected and served on publishers' webpages according to the various keywords and other targeting criteria specified by the advertiser.

Once an advertising campaign is launched, and advertiser uses the advertising management tools to monitor the performance of the advertising campaign. Depending on the performance of the advertising campaign, the advertiser may desire to change targeting, bids, budgets, advertisements, etc., of the advertising campaign. However, the advertising campaign may have hundreds of bids, time sensitive budgets, and thousands of targeting criteria. Furthermore, the changing of any one of these parameters may be dependent on various conditions. Thus, the monitoring of an advertising campaign and changing of multiple parameters at various times during the life of the advertising campaign can be a labor-intensive task.

SUMMARY

In general, one innovative aspect of the subject matter described in this specification can be embodied in methods that include the actions of accessing advertising campaign data including: a plurality of campaign management entities including account entities that each define an advertising account, advertising campaign entities that each define an advertising campaign and each being associated with an account entity, advertisement group entities, each advertisement group entity associated with an advertising campaign entity and defining an advertisement group and specifying respective advertisement entities, targeting entities, and bid entities, wherein each respective advertisement entity defines an advertisement, each targeting entity defines a targeting criterion, and each bid entity defines a bid, and each are associated with the advertisement group entity, and a plurality of rules, each rule associated with at least one of the campaign management entities and defining an operation and a corresponding event, the event being the occurrence of a condition defined for the campaign management entity with which the rule is associated and the operation being executed in response to the detection of the corresponding event and specifying an entity change for one or more campaign management entities, and for each rule: determining, in response to detecting the event defined by the rule, whether the operation is to be executed in separate execution fragments; in response to determining that the operation is not to be executed in separate execution fragments, executing the operation associated with the event by the rule and in response to the execution changing the campaign management entities according to the specified campaign entity change; and in response to determining that the operation is to be executed in separate execution fragments: partitioning the plurality of campaign management entities for which an entity change is specified into one or more subsets, instantiating a separate execution fragment for each subset according to a parallelization constraint defining a maximum resource allocation for instantiations of separate execution fragments for the rule, wherein in each separate execution fragment the operation is executed on only the subset to change the campaign management entities that belong to the subset according to the specified campaign entity change. Other embodiments of this aspect include corresponding systems, apparatus, and computer programs, configured to perform the actions of the methods, encoded on computer storage devices.

In general, another innovative aspect of the subject matter described in this specification can be embodied in methods that include the actions of accessing, by a data processing apparatus, a data store storing: advertising campaign data used by an advertising service, the advertising campaign data including campaign management entities, the campaign management entities including a plurality of account entities at an account level, each defining an advertisement account, advertising campaign entities at a campaign level that each define an advertising campaign, and that are each subordinately associated with one of the account entities, a plurality of advertisement group entities at an advertising group level, each advertisement group entity defining an advertisement group and subordinately associated with one of the advertising campaign entities, and a plurality of advertisement entities at an advertisement level and targeting entities at a targeting level, each advertisement entity and targeting entity being subordinately associated with one of the advertising campaign entities, and respective advertisement entity defining an advertisement and each targeting entity defining a targeting criterion; a plurality of rules, each rule associated with at least one of the campaign management entities and defining an operation and a corresponding event, the event being the occurrence of a condition defined for the campaign management entity with which the rule is associated and the operation being executed in response to the detection of the corresponding event and specifying an entity change for one or more campaign management entities, and wherein at least one of the rules is a candidate rule; determining, by the data processing apparatus, a particular account entity associated with the candidate rule; for each other rule associated with the particular account entity: determining whether the campaign management entities for which an entity change is specified by the rule overlap with the campaign management entities for which an entity change is specified by the candidate rule; and in response to determining that the campaign management entities for which an entity change is specified by the rule overlap with the campaign management entities for which an entity change is specified by the candidate rule, generating a notification that specifies the overlap of the campaign management entities for the rule and the candidate rule. Other embodiments of this aspect include corresponding systems, apparatus, and computer programs, configured to perform the actions of the methods, encoded on computer storage devices.

In general, another innovative aspect of the subject matter described in this specification can be embodied in methods that include the actions of accessing a data store storing advertising campaign data used by an advertising service, the advertising campaign data including a plurality of campaign management entities including an advertising campaign entity that defines an advertising campaign, a plurality of advertisement group entities, each advertisement group entity defining an advertisement group and specifying respective advertisement entities and targeting entities, wherein each respective advertisement entity defines an advertisement and each targeting entity defines a targeting criterion, and each are associated with the advertisement campaign entity; accessing a rule associated with at least one of the campaign management entities, the candidate rule defining an operation and a corresponding event, the event being the occurrence of a condition defined for the campaign management entity, and the operation being specifying an entity change for the associated campaign management entity; receiving, at first time, an schedule time for the rule that defines an execution time for the rule: determining, for the rule, a scheduled execution time based on the schedule time and the first time, the schedule execution time being a time at which the rule is to be executed according to a schedule; associating the scheduled execution time with the rule; and in response to determining that a current time is equal to the scheduled execution time, executing the rule. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. The invocation of various rules based on detected events allows advertisers to automate the changing of many features of an advertising campaign. The automation of such changes allows advertisers to focus more time on the effects of the change and less time on manual processes to implement changes. This shift in focus, in turn, allows advertisers to devote more time to achieving the goals of their campaign, and this leads to better campaign management.

Rules can be triggered by events that are observed by an advertising service that is used to manage the advertising campaign, and by other application services that are external to the advertising service. This allows advertisers to manage their advertising campaigns from a variety of different application services, and have reports published in the format for different application services.

The execution of a rule can be partitioned into subsets that are executed in corresponding execution fragments that are executed in parallel. This can, for example, ensure that the rules are executed within a timeout constraint defined by an existing scripting system. This results in fewer data collisions and an increase in throughput. The batching into subsets is scalable, so that scripts for very large campaigns with hundreds of thousands of affected entities can be run within the timeout period.

In some implementations, the execution fragments are executed according to one or more parallelization constraints. The parallelization constraints ensure that any one rule and/or the rules of any one entity do not exceed a maximum resource demand and any one time. Accordingly, should one advertiser have an associated rule that is resource intensive, the execution of the operations of the rule will not impact the performance as seen by other advertisers.

Rules are often scheduled to be executed at particular times, e.g., 1:00 PM, 2:00 PM, and so on. In some implementations, the actual execution time of a rule is smoothly distributed relative to the other start times of other rules. The smooth distribution is accomplished by use of an algorithm that takes into account when the users specify the execution time of a rule. The distribution of the execution time avoids resource spikes that would otherwise occur if all rules scheduled at a particular execution time were executed the particular execution time. Furthermore, the distribution of a schedule time allows for fewer scheduling options for users (e.g., a drop down us interface with 24 hour selections) rather than requiring a user to manually enter a particular time. This simplifies the user interface and also reduces the frequency of input errors, as users are provided only with a set of particular times to choose from.

The advantages listed above are not exhaustive, and other advantages are also realized.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is an illustration of a user interface through which rules associated with an advertising campaign can be accessed.

FIG. 3 is an example user interface for keyword rules at an ad group level.

FIG. 4 is an example user interface for ad group rules at an ad group level.

FIG. 7A is an example user interface for campaign rules that includes an overlapping entity detection notice.

Like reference numbers and designations in the various drawings indicate like elements.

DETAILED DESCRIPTION

Example Environment

Figure 1A:
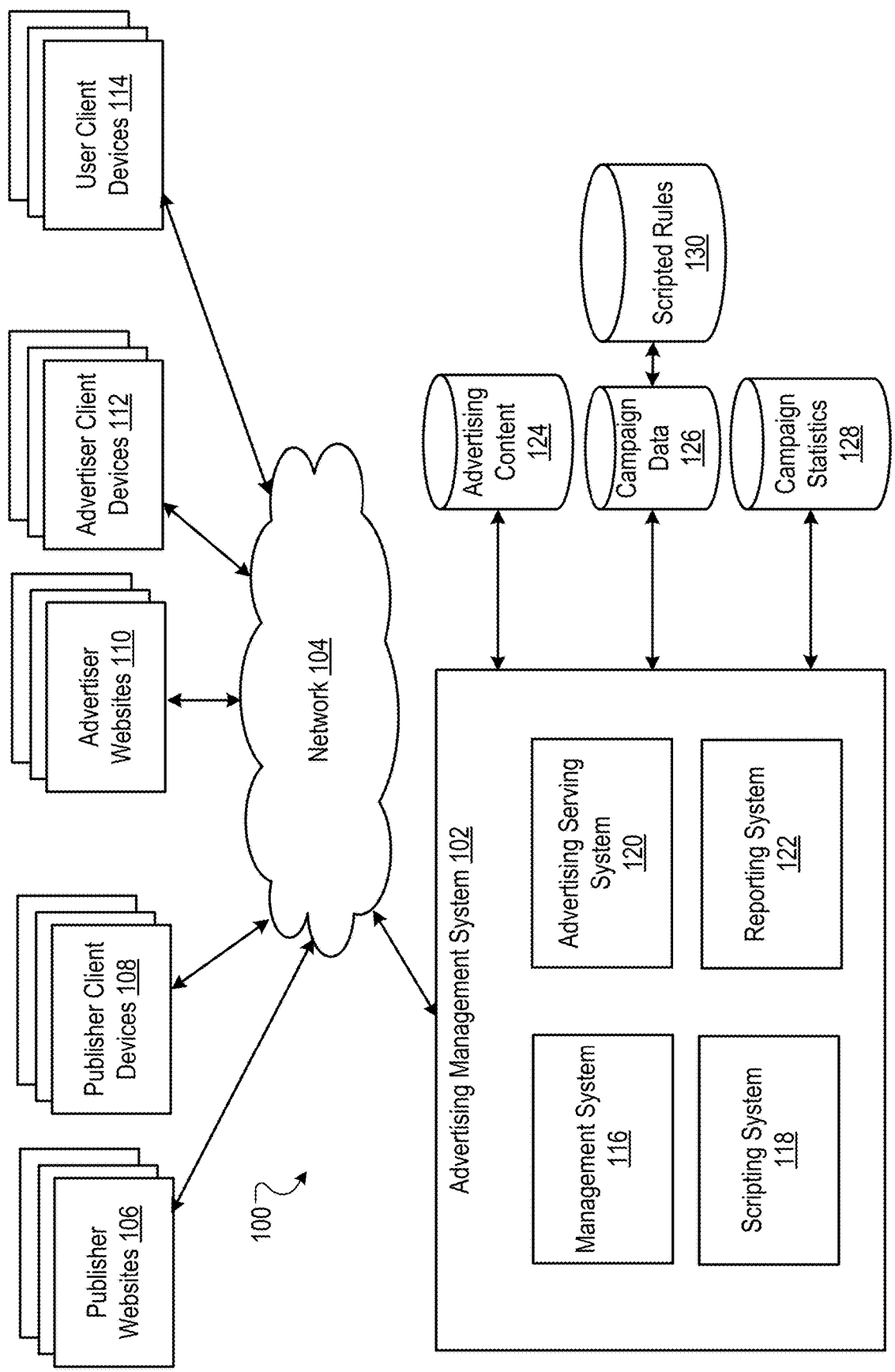
FIG. 1A is a block diagram of an example online advertising environment.

FIG. 1 is a block diagram of an example online advertising environment 100. The online advertising environment 100 utilizes an advertising management system 102 to facilitate the sale and purchase of online advertising opportunities between publishers and advertisers.

The online advertising environment 100 includes a computer network 104, such as a local area network (LAN), wide area network (WAN), the Internet, or a combination thereof, connecting publisher websites 106, publisher client devices 108, advertiser websites 110, advertiser client devices 112, user client devices 114, and the advertising management system 102. The advertising management system 102 further has access to an advertising content store 124, a campaign data store 126, and a campaign statistics store 128.

Each publisher website 106 has one or more webpage resources associated with a domain name, and each publisher website 106 is hosted by one or more servers. An example website is a collection of webpages formatted in hypertext markup language (HTML) that can contain text, images, multimedia content, and programming elements. Each publisher website 106 is maintained by a publisher, e.g., an entity that manages and/or owns the website.

Publisher client devices 108, advertiser client devices 112, and user client devices 114 are electronic devices that are under the control of users. In particular, the publisher client devices 108 are under control of users that are agents of the publishers, the advertiser client devices 112 are under the control of users that are agents of the advertisers, and user client devices 114 are under the control of users that are not associated with the publishers or advertisers. A client device typically includes a user application, such as a web browser, to facilitate the sending and receiving of data over the network 104.

The advertising management system 102 facilitates the sale and purchase of advertising opportunities between publishers 106 and advertisers 110. The advertising management system 102 includes components such as a management system 116, a scripting system 118, an advertising serving system 120, and a reporting system 122. The advertiser management system 116 provides user interfaces for advertisers (e.g., using advertiser client devices 112) to define advertising campaigns and ad groups, submit advertising content, and specify various targeting and/or ad placement criteria for the advertising content in each advertising campaign and/or ad group. The advertising content is stored in the advertising content store 124 and the targeting and ad placement criteria are stored in the campaign data store 126. For each ad group or campaign, the advertisers can also specify bids for ad slots associated with particular keywords through the interface provided by the advertiser management system 116. Advertisers' bids, budgets, as well as other campaign related preferences are also stored in the campaign data store 126.

An account management tool can be employed by an advertiser to create and manage a large number of online advertising campaigns for various products and services that the advertiser offers. The account management tool can be made available to the advertiser either through an online interface provided by the advertiser management system 116 or as an account management software application installed and executed locally at the advertiser's client devices 112. The online interface and/or the locally executed account management software application can be used for downloading existing account data from the advertiser management system 116 and for uploading new and/or modified account data to the advertiser management system 116.

The advertiser can create and manage multiple advertising campaigns using the account management tool offered by the advertiser management system 116. The advertiser can further specify multiple ad groups under each ad campaign, and specify respective advertisements, budgets, keywords, and other targeting and/or ad placement criteria for each of the ad groups. Typically, the advertising account can be abstracted into a hierarchical structure. For example, the advertising account can include one or more ad campaigns, each ad campaign can include one or more ad groups, and each ad group can include one or more advertisements and keywords.

Each advertising campaign is represented in the campaign data stores as a collection of associated campaign entities. Each particular advertising campaign is represented by an advertising campaign entity for the advertising campaign, and each advertising campaign entity can be associated with one or more advertisement group entities, each of which defines an advertisement group. Each advertising group entity, in turn, is associated with respective advertisement entities, a budget entity, targeting entities, and bid entities. Each respective advertisement entity defines an advertisement, the budget entity defines a budget, each targeting entity defines a targeting criterion, and each bid entity defines a bid. Other entity associations are also possible, e.g., an advertising campaign entity can be associated with a budget entity defining an overall budget, etc. Finally, an account entity is used to identify the advertiser, and all advertising campaign entities for campaigns of the advertiser are associated with the advertiser's account entity.

To create a new ad campaign, a user can first specify values for the campaign level advertising parameters of the ad campaign. The campaign level advertising parameters include, for example, a campaign name, a preferred content network for placing ads, a budget for the ad campaign, start and end dates for the ad campaign, a schedule for ad placements, a targeted language, and targeted geographical locations. Other campaign level advertising parameters includes, for example, a payment scheme such as a cost-per-click (CPC), cost per thousand impressions (CPM), cost-per-action (CPA), and so on.

For the ad campaign, the user can further define one or more ad groups. An ad group contains one or more advertisements, which target a particular set of keywords, ad placements, or both. Ad groups under the same campaign can share the same campaign level advertising parameters, but have tailored specifications for particular ad group level advertising parameters, such as keywords, bids for keywords, budget, and so on.

Generally, an advertiser can create different ad groups to have more focused targeting on different product lines or services. For example, different sets of keywords specific to the different product lines or services can be used for the different ad groups. Sometimes, different ad groups can also target different market segments and/or demographic characteristics. Keywords specific for the different market segments and/or demographic characteristics can be included in the different ad groups.

To create a new ad group, the user can first specify values for the ad group level advertising parameters of the ad group. The ad group level advertising parameters include, for example, an ad group name, and various bids for different ad placement opportunities (e.g., automatic placement, advertiser managed placement, etc.) or outcomes (e.g., clicks, impressions, conversions). An ad group name can be one or more terms that the user can use to concisely capture a topic or subject matter that the ad group is targeting. For example, a car dealership can create a different ad group for each type of vehicles it carries, and may further create a different ad group for each model of vehicles it carries. Examples of the ad group themes that the car dealership can use include, for example, "sports car," "sedan," "truck," "hybrid," and so on.

After creating the campaign and one or more ad groups under the campaign, the advertiser can specify one or more keywords and advertisements to each ad group. The keywords are typically terms that are relevant to the product or services that the user wishes to promote for the ad group. Each keyword can include one or more terms. For example, the car dealership may include "automobile", "sports car," "V-6 engine," "four-wheel drive," "fuel efficiency," and so on as keywords for its ad groups and ad campaigns. The advertiser can also specify whether exact match of keywords are required for ad placements on the content network.

In addition to keywords, for each ad group, the advertiser can also specify a number of advertisements for selection by the ad server when an advertising opportunity becomes available that matches the budget, ad schedule, maximum bids, keywords, and other targeting criteria specified for the ad group. Different types of ads can be included in an ad group, such as a text ad, an image ad, a local business ad, a mobile ad, and so on.

Other aspects of the ad group can be defined in terms of various advertising parameters and specified by user-entered values or default values for those various advertising parameters. After the advertiser has specified all the required advertising parameters for each level and aspect of the ad campaign(s), the advertising campaign entity data (e.g., including the campaign structure and the advertising parameters on each level within the campaign structure) can be uploaded to the advertiser management system 116, and the data are persisted to the campaign data store 126. The advertising campaign can be created and activated according to the advertising campaign data specified by the advertiser.

The management system 116 also provides an interface for publishers (e.g., using publisher client devices 108) to specify ad slots available on the publisher's online properties. For example, the publishers can specify the cost, type, dimensions, and targeting criteria (e.g., keywords associated with the content of the online properties) for each ad slot. The publisher management server 118 provides scripts or references to scripts to the publishers according to the specifications of the ad slots.

Each publisher 106 can insert instructions into its webpages or content items. When the webpages and content items are downloaded to user client devices 114, the instructions are executed to generate one or more ad requests to the advertising management system 102. The advertising serving system 120 of the advertising management system 102 responds to the ad requests by sending advertisements to the requesting user client device 114 for insertion into appropriate ad slots in the publisher's webpages or content items as rendered on the requesting user client device 114. The advertisements can include embedded links to landing pages (e.g., webpages on the advertisers' websites 110) that a user is directed to when the user clicks on the advertisements presented on the publisher's webpages or in the content items.

The ad requests are optionally associated with user characteristics (e.g., user's age, gender, income, language preferences, and so on) and advertising context (e.g., keywords associated with webpage content, location, local time of ad request, and so on).

Various user privacy measures are implemented to remove personally identifiable information from the user characteristics data. The advertising serving system 120 can select advertisements from the advertising content store 124 for each ad request based on a match between an advertiser's campaign criteria in the campaign data store 126 and the user characteristics and advertising context associated with the ad request.

The advertisements provided after a successful match, and optionally user responses (e.g., click-throughs, conversions, and so on) to the advertisements, can be tracked by various tracking mechanisms (e.g., tracking cookies, pixel callbacks, etc.), sent back to the advertising management system 102, and stored in the campaign statistics store 128. The tracking is enabled by various user opt-in processes. The reporting system 122 provides user interfaces for advertisers and publishers to review reports on the campaign statistics in various formats. Performance of particular keywords, ad groups, and campaigns can be measured based on various performance metrics, such as cost per action (e.g., click or conversion), conversion length (e.g., number of clicks between initial impression and conversion), and so on.

Scripting System

The advertising management system 102 also includes a scripting system 118 that facilitates advertising server scripting for automated management of an online advertising campaign. In some implementations, the scripting system 118 can be a part of the advertisement management system 116, and be realized by series of online user interfaces or a user interfaces generated from locally executed account management software.

Each advertiser, by means of user interface provided by the scripting system 118, can define scripted rules 130 and associate the rules with their advertising campaigns. The scripting system 118 facilitates the automation of actions that allow advertisers to associate campaign management operations with events that trigger the automations. The combination of one or more events and one or more operations is defined as a rule. The advertisement management system 102 monitors for the events, and upon the occurrence of events associated with a particular rule, the operations associated with that rule are executed.

In some implementations, the scripting system 118 pre-authorizes the operation of a rule based on the credentials of a particular user that is generating the rule. For example, if a particular advertising executive of an advertiser generates a rule by use of the scripting system 118, and the user is authorized to manually perform the operations defined by the rule, then the scripting system pre-authorizes the execution of the rule on behalf of the user. In addition, changes made to the campaign according to the specified changes of the rule are attributed to the user. Conversely, if the user is not authorized to manually perform the operations defined by the rule, then the scripting system does not pre-authorize the execution of the rule on behalf of the user.

Each rule is associated with an advertising campaign entity (e.g., directly associated with an advertising campaign entity or associated with a child entity of the advertising campaign entity) and defines an operation and a corresponding event. As used in this specification, an event is the occurrence of a condition defined for the advertising campaign(s) (or child entities of the advertising campaign) by the advertiser. The condition can be budget related, performance related, date related, targeting related, user device type related, etc., and combinations of one or more of these conditions. Events are described in more detail below.

The scripting system 118 executes the operation in response to the detection of the corresponding event. Each operation specifies an entity change for a campaign management entity associated with the advertising campaign entity and the rule.

Figure 1B:
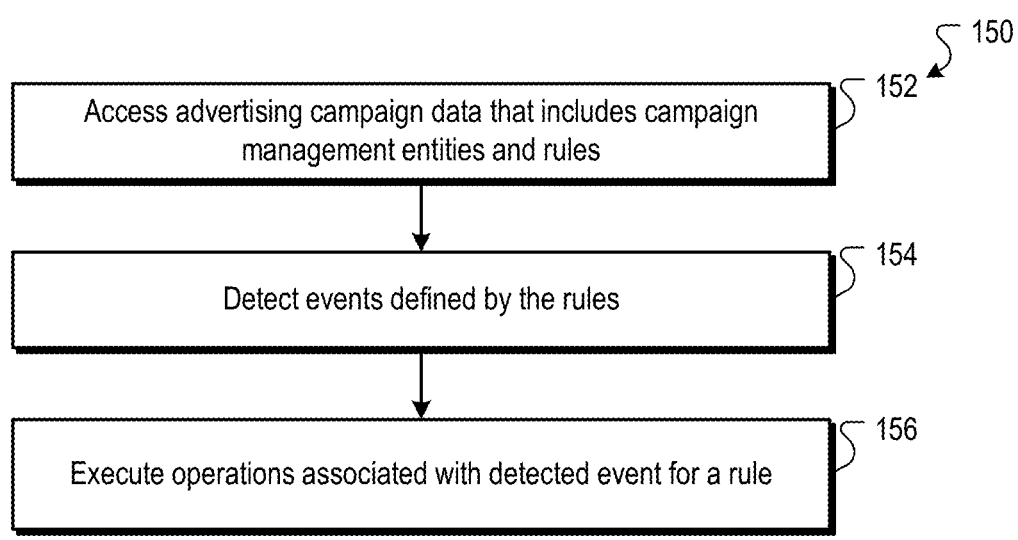
FIG. 1B is a flow diagram of an example process for executing rules associated with a campaign.

FIG. 1B is a flow diagram of an example process 150 for executing rules associated with a campaign. The process 150 can be implemented by the scripting system 118.

The scripting system 118 accesses advertising campaign data that includes campaign entities and rules (152). For example, the scripting system 118 accesses the campaign data store 126 of the advertising management system 102, and scripted rules 130 that are associated with the campaign data and defined by the advertisers.

The scripting system 118 detects events defined by the rules (154). For example, the scripting system 118, for each rule, determines the condition defined by the rule and checks to determine if the condition has occurred. If the condition has occurred, then the event is detected. An example of a condition is a click through rate associated with an ad group exceeding a threshold percentage defined by the advertiser. The conditions can be checked periodically, e.g., according to a frequency parameter associated with the rule. Conditions and frequencies are described in more detail below.

The scripting system 118 executes operations associated with the detected event for a rule (156). For example, scripting system 118 will change values associated with corresponding campaign entities affect by the operation and persist the changes to the campaign data store 126. An example of an operation is a changing of the cost per click bid associated with a particular ad group by a predefined percentage. Operations are described in more detail below.

In some implementations, each rule is also associated with the user identifier of the user that defined the rule. When the operations associated with the event by the rule are executed, the campaign management entity changes that occur are attributed to the user identifier. This allows the advertiser to track responsible parties that authorized the change to particular campaign entities, and, in some implementations, precludes the execution of the operation if authorization privileges associated with the user identifier have been revoked.

Example Scripting User Interfaces

The scripting system 118 provides a variety of user interfaces that facilitate the creation of rules for campaigns. FIG. 2A illustrates a user interface 200 through which rules associated with an advertising campaign can be accessed. As shown by the path 202 in FIG. 2A, campaign entities associated with a campaign identified by the advertising campaign entity "stamp classes" and an advertising group identified by the advertising group entity "cards" are displayed. The particular campaign entities that are shown are keyword targeting entities, as indicated by the selected tab of the tab list 204.

Various keywords and associated parameters are identified by data shown in the columns 206. For example, the keywords "stamping classes", "stampin up classes", etc., are associated with the ad group cards of the advertising campaign stamp classes. Thus, advertisements that are associated with this ad group are targeted using the keywords shown. The user may select specific keywords shown in the columns.

The user interface 200 includes an automate menu button 208 that can be used to access and manage rules associated with the advertising group "cards." In response to a selection of the automate menu button 208, the user interface 200 generates an automation menu 210. The menu includes multiple submenus 212, 214, 216, 218, and 222.

In some implementations, the submenus 212, 220, and 222 are static menus that are shown each time an automate menu button 208 is selected, and each additional submenu (e.g., submenus 214, 216, and 218) are contextual menus that are dependent on the particular campaign entity to which the user interface 200 corresponds. In FIG. 2A, for example, the user interface 200 presents keywords at an advertising group level. The contextual submenu 214 corresponds to keywords, and can be used to access an environment for creating rules for keywords. For example, as shown in FIG. 2A, rules with three different types of operations can be created—pausing keywords, changing a max cost per click (CPC) bid, and raising bids to a first page CPC. Likewise, the contextual submenu 216 corresponds to ad groups, and can be used to access an environment for creating rules for ad groups. Here, rules with two different types of operations can be created—pausing an ad group, and changing an ad group max CPC. Similarly, the contextual submenu 218 can be used to access environment for creating rules for campaigns. From the submenu 218, rules with two different types of operations can be created—pausing the campaign, and changing a daily budget.

The rule creation options shown in FIG. 2A are an example default set of rule creation options that available to all advertisers. As will be describe in more detail below, advertisers may also define customized operations for creating rules, and associate the customized rules with particular campaign entities. If such customized operations are defined, they are shown in the automation menu 210 if the user interface from which the automation menu is invoked is at a campaign level that corresponds to an associated customized operation.

Figure 2B:
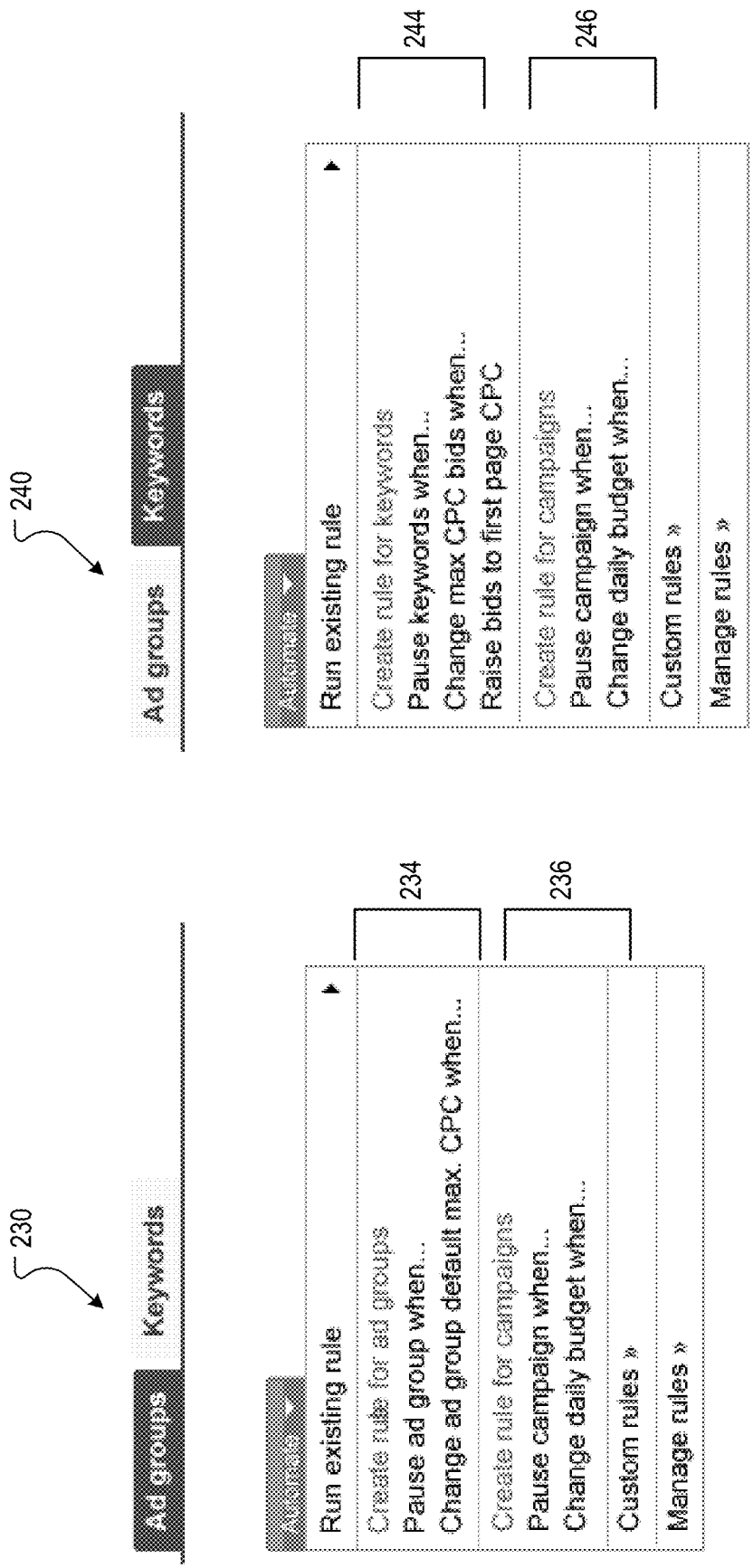
FIGS. 2B and 2C are illustrations of automation menus for different campaign entities at different campaign levels.
Figure 2C:
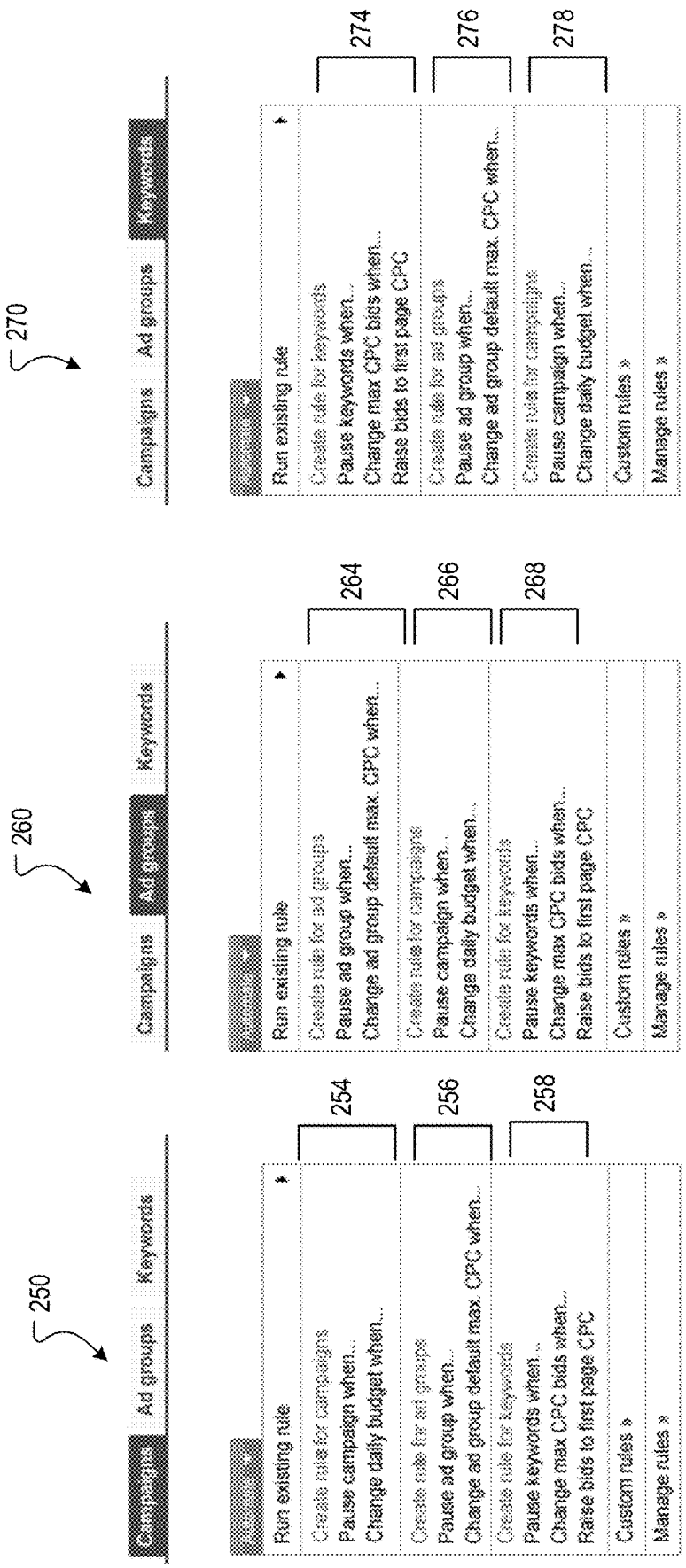

In general, an automation menu for a particular user interface corresponds to particular campaign level and campaign entities to which the user interface corresponds. FIGS. 2B and 2C are illustrations of automation menus for different campaign entities at different campaign levels. The automation menus 230 and 240 of FIG. 2B are automation menus that are generated at the campaign level for user interfaces that respectively present ad groups and keywords at the campaign level. The automation menu 230 includes contextual submenus 234 and 236. The contextual submenu 234 corresponds to advertising groups, and can be used to create rules for advertising groups. Likewise, the contextual submenu 236 corresponds to campaigns, and can be used to create rules for campaigns. The automation menu 240 is similar to the automation menu 230, including two contextual submenus 244 and 246. The contextual submenu 244 corresponds to keywords, and the contextual submenu 246 corresponds to campaigns.

The automation menus 250, 260, and 270 of FIG. 2C are automation menus that are generated for user interfaces that present all advertising campaigns associated with an advertiser. The automation menu 250 is generated in the user interface from which the user may select multiple campaigns, and includes contextual submenus 254, 256, and 258, that are respectively associated with campaigns, ad groups, and keywords. Likewise, the contextual submenu 260 is generated in a user interface in which a user may select multiple advertising groups from multiple campaigns, and includes contextual submenus 264, 266, and 268 that are respectively associated with advertising groups, campaigns, and keywords. The contextual submenu 270 is generated in a user interface in which a user may select multiple keywords for multiple campaigns, and includes contextual submenus 274, 276, and 278 that are respectively associated with keywords, advertising groups, and campaigns.

Figures 3, 4:
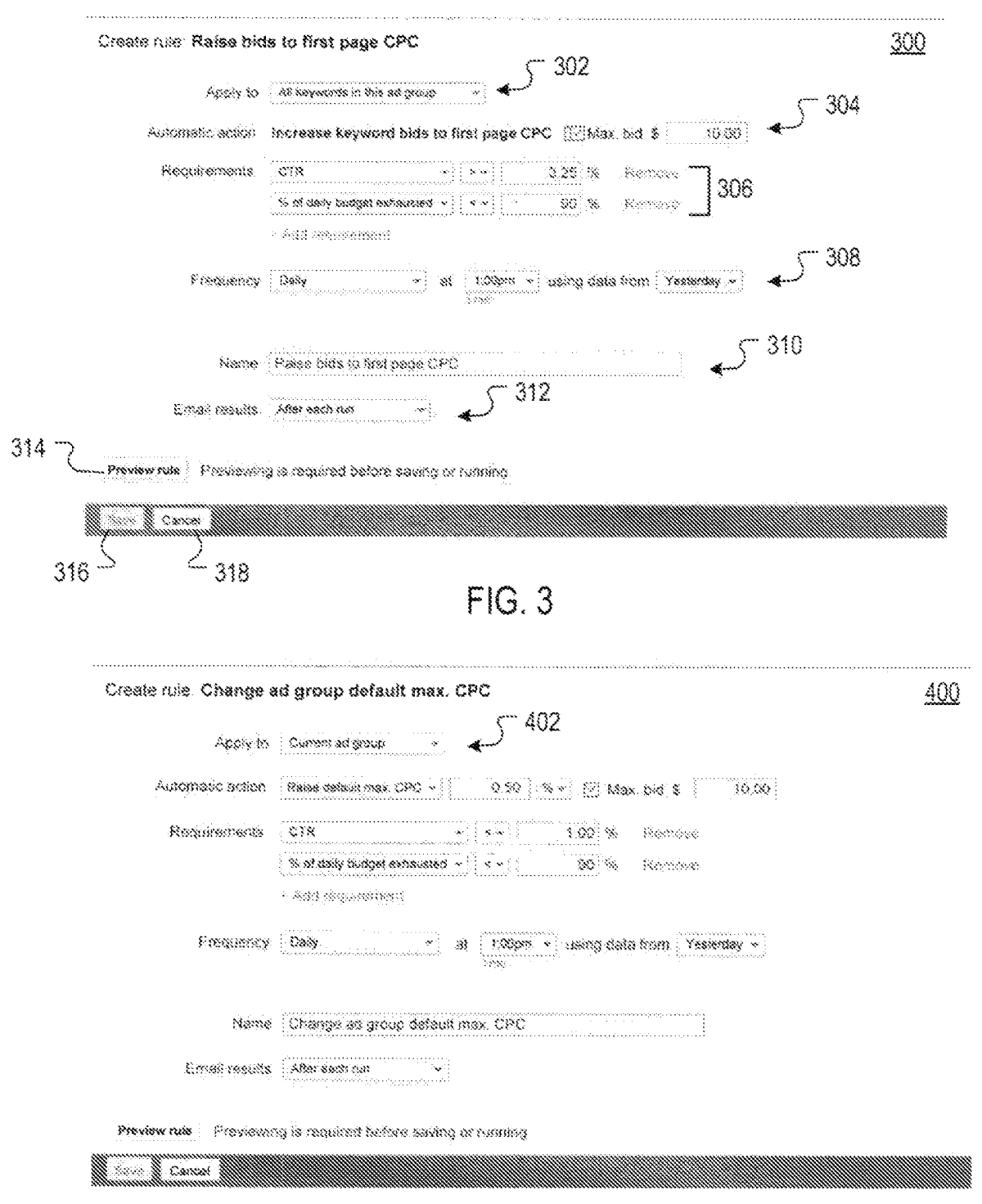

FIG. 3 is an example user interface 300 for keyword rules at an ad group level. The user interface 300, for example, can be accessed through an automation menu, or through another user interface element that can be used to invoke a rule creation environment. The user interface 300 is being used to create a rule titled "Raise bids to first page CPC."

An apply menu 302 is used to select campaign entities to which the rule will be associated. As shown in FIG. 3, the rule is currently selected to be applied to all keywords in a selected advertisement group. An alternative application selection could be, for example, a subset of keywords within an advertisement group.

The rule defines a corresponding operation 304 that, when executed, results in an increase in keyword bids for all keywords in the ad group, up to a maximum bid of $10, or some other value specified by the advertiser. For example, if the operation were to be executed, and a current first page cost per click for certain keywords is $4.50 and current keyword bids in the ad group are $3.25, then bid entities for the current keyword bids are increased to $4.50.

Also associated with the rule are conditions that define the event that will result in execution of the operation. The conditions are defined by requirements 306, each with different corresponding condition thresholds. The example condition shown are a keyword click through rate of 3.25% or higher, and an advertisement group spent budget of 90% or less. Accordingly, provided the budget for the advertisement group is not almost exhausted (e.g., less than 90% spent), bids for high-performing keywords (e.g., keywords with the click through rate of 3.25% or higher) will be increased up to a maximum of $10. Additional requirements can be added by the user in response to the user selecting the "+Add requirement" link.

Frequency menu items 308 are used to define one or more frequency parameters for the rule. Frequency parameters are used to define the frequency and frequency conditions at which the rule is executed. As shown in FIG. 3, the rule is to be executed daily at 1:00 PM using performance data from the prior day. Other frequencies can also be used, such as weekly, monthly, or even a one-time frequency. Likewise, different times can be used, and performance data can be used from other time periods, such as data from the last week, or even data from the last month. In some implementations, rules can be defined with frequency parameters, and each rule defined with the default frequency parameters are executed at the same frequency.

In some implementations, the frequency is dependent on an execution time, e.g., a daily execution time. Users often select similar or same execution times whether given a predefined list of possible execution times or when they are required to enter the execution times. For example, users may be presented with a list of hourly execution times, and thus all rules in the system will be scheduled for execution at one of 24 possible start times. Conversely, if users must manually type in the execution time, users will usually pick times that are standard references, e.g., particular hours (1:00 PM, 2:00 PM, and so on), or increments thereof (1:30 PM, 2:30 PM, and so on). Such tight distributions of execution times leads to poor resource management. In particular, resource demands spike during the execution times, resulting in fewer resources being available. Conversely, at other times, the resource demands are low, resulting in many underutilized resources. Thus, in some implementations, and as described with reference to FIG. 6 below, the execution times are distributed according to distribution algorithm.

The user interface 300 includes a name input field 310 in which a user may type the name of the rule, and a reporting menu item 312 through which a user may specify an e-mail reporting frequency.

The user interface 300 also includes a preview rule button 314. In some implementations, such as the implementation shown in FIG. 3, the rule must be previewed before the rule can be persisted to the scripted rules 130 for use in the automated management of an advertising campaign.

A save button 316 and a cancel button 318 are also included in the user interface 300. As depicted in FIG. 3, the save button 316 is currently disabled, indicating that the rule has not been previewed. Once the rule is previewed, the rule may be saved by use of the save button 316. Once the rule is saved, the rule will be available in the application menu for user interfaces that correspond to campaign entities to which the rule is to be applied as specified by the apply menu 302. Accordingly, by creating multiple rules and associating each with different campaign entities, the scripting system 118 creates a context-based rule application environment.

The options available in the apply menu 302 can, in some implementations, differ depending upon the particular campaign entity level from which a user invoked the user interface 300. The options vary because the campaign management entities are associated according to a hierarchy in which the advertisement entities, budget entities, targeting entities, and bid entities are subordinate to the advertisement group entities, and the advertisement group entities are subordinate to the advertising campaign entities. The advertising campaign entities, in turn, are subordinate to the account entities. Thus, in some implementations, a rule applied to any campaign entity at a particular node in a hierarchy may also be selectively applied to other campaign entities of the same type but at different nodes in the hierarchy.

For example, as described above, the user interface was invoked at an advertisement group level (i.e., invoked from a user interface in which keywords for a particular advertisement group are shown). Accordingly, the available options to which the rule may be applied are all keywords within the advertisement group, and selected keywords within the advertisement group. In some implementations, if the user interface were invoked at a campaign level (i.e., invoked from a previous user interface in which keywords for a particular advertisement campaign are shown), then the available options to which the rule may be applied are all keywords in the particular campaign, and a subset selected keywords within the advertisement campaign. Likewise, if the user interface were invoked from user interface in which keywords were shown for all advertising campaigns for a particular advertiser (e.g., an "all campaigns" level), then the available options to which the rule may be applied are all keywords for all campaigns, and a subset of selected keywords from the advertisement campaigns.

Accordingly, any one rule associated with an advertising campaign entity can further be associated with all campaign entities subordinate to the advertising campaign entity (e.g., targeting entities such as keywords). Likewise, the condition for the rule can also be defined for a campaign management entity subordinate to the advertising campaign entity (e.g., the targeting entities that are subordinate to the advertising campaign entity).

In some implementations, the user interface 300 is a default user interface for one of several default rules that are available to all advertisers. Other default rules at the keyword level include, for example, changing the max CPC bid, and pausing particular keywords. For example, the contextual submenu 214 of FIG. 2 includes a respective menu item for each of the user interfaces. Conditions necessary for defining events for the execution of particular operations to change the max CPC bid of keywords, and pausing particular keywords, can be defined by users in the respective user interfaces.

FIG. 4 is an example user interface 400 for ad group rules at an ad group level. The user interface 400 can, for example, be accessed through an automation menu, or through another user interface element that can be used to invoke a rule creation interface. The user interface 400 is being used to create a rule titled "Raise bids to first page CPC." The user interface environment is similar to the user interface 300 of FIG. 3. The rule being defined by the user interface 400 results in a 50% increase in the maximum cost per click for an advertisement group if two conditions are met. The first condition is that the advertisement group is a low performing advertisement group (e.g., with the click through rate less than 1%), and the second condition is that the budget for the advertisement group is not almost exhausted (e.g., less than 90% of the daily budget has been spent).

Thus, the condition of the rule is a click through rate threshold for the advertisement group defined by the advertisement group entity meeting a first threshold. The operation of the rule is adjusting a bid defined by a bid entity associated with the advertisement group entity so that the bid meets a cost per click value that increases the likelihood that an advertisement of the advertisement group is displayed.

The options available in the apply menu 402 can, in some implementations, differ depending upon the particular campaign entity level from which a user invoked the user interface 400. As shown in FIG. 4, the user interface 400 was invoked at an advertisement group level. Accordingly, the available options to which the rule may be applied to are selected advertisement group, all advertisement groups in a selected campaign, and all advertisement groups in all campaigns. In some implementations, if the user interface were invoked at a campaign level, then the available options to which the rule may be applied are selected advertisement groups, or all advertisement groups in a particular campaign. Likewise, if the user interface were invoked from an all campaigns level, then the available options to which the rule may be applied are selected advertisement groups, all advertisement groups, and all campaigns.

In some implementations, the user interface 400 is a default user interface for one of several default rules that are available to all advertisers. Other default rules at the advertising group level include, for example, pausing an advertisement group. For example, the contextual submenu 216 of FIG. 2 includes a respective menu item for each of the user interfaces. Conditions necessary for defining events for the execution of the particular operations associated with the advertising groups can be defined by users in the respective user interfaces.

Figures 5, 6:
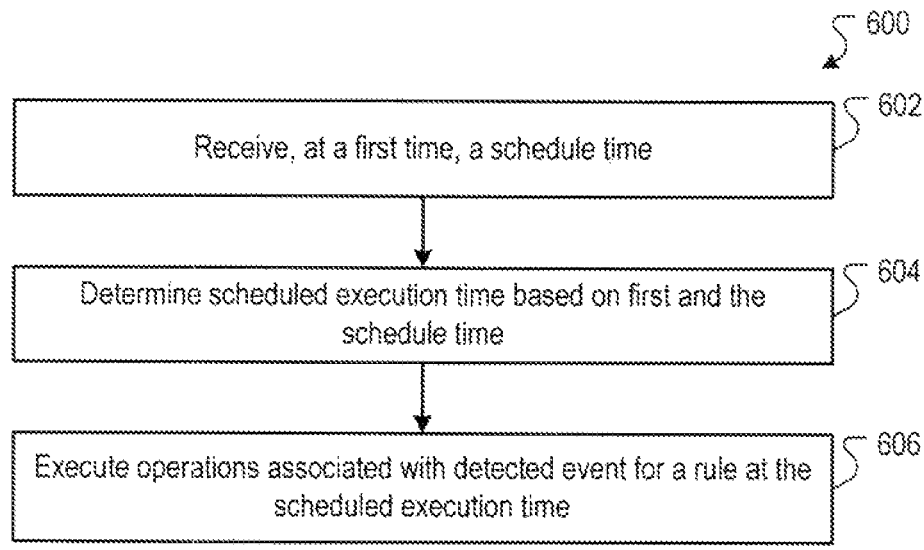
FIG. 5 is an example user interface for campaign rules at an ad group level.
FIG. 6 is a flow diagram of an example process for distributing execution times for rules.

FIG. 5 is an example user interface 500 for campaign rules at an ad group level. In FIG. 5, the campaign management entity is an advertising campaign entity, and the conditions 506 of the rule are a click through rate threshold for the campaign identified by the campaign entity not meeting a first threshold and a traffic parameter (impressions) of the campaign not meeting a second threshold. The operation 504, upon execution, results in a pausing of the campaign provided the event defined by the conditions occur to preclude the serving of advertisements associated with the campaign.

The options available in the apply menu 502 can, in some implementations, differ depending upon the particular campaign entity level from which a user invoked the user interface 500. As shown in FIG. 5, the user interface 500 was invoked at an advertisement group level for a selected campaign. Accordingly, the available options to which the rule may be applied are currently selected campaign, and all campaigns. In some implementations, if the user interface were invoked at an all campaigns level for advertising campaigns, then the available options are selected campaigns and all campaigns. Otherwise, the only available option to which the rule may be applied is all campaigns.

In some implementations, the user interface 500 is a default user interface for one of several default rules that are available to all advertisers. Other default rules at the advertising group level include, for example, changing a daily budget. For example, the contextual submenu 218 of FIG. 2 includes a respective menu item for each of the user interfaces. Conditions necessary for defining events for the execution of the particular operations associated with the advertising groups can be defined by users in the respective user interfaces.

Distribution of Execution Times

As described above, distribution of execution times from the specified frequency parameter times reduces resource demands spikes and traffic bursts. In some implementations, the scripting system 118 implements a distribution algorithm that distributes scheduled execution times. In some examples, the distribution is based on the execution time and a time at which the execution time is specified. An example process 600 that implements an algorithm for distributing execution times for rules is shown in FIG. 6.

In operations, the process 600 receives, at a first time, a schedule time for a rule that defines an execution time for the rule (602). For example, with respect to FIG. 5, the schedule time is 1:00 PM. The first time can, in some implementations, be the time that the user selected the time (e.g., the time that the user saved or previewed the candidate rule), or the time that the system 118 receives data defining the rule.

Based on the schedule time and the first time, the process 600 determines a scheduled execution time (604). The scheduled execution time is a time at which the rule is to be executed according to a schedule, and depending on the first time, will differ from the schedule time.

The scheduled execution time is associated with the rule. Thereafter, the process 600 monitors the current time, and when the current time is equal to the scheduled execution time, the rule is executed (606).

There are several ways in which the scheduled execution time can be determined from the first time and the schedule time. For example, in some implementation, a time variation is determined from the first time, and the schedule time is adjusted by the time variation. For example, the schedule time can be one of many different schedule times, each from the other by at least a minimum time period, e.g., for a minimum time period of one hour, the schedule times can be each an hours time, such as the hour of the day—12:00 AM, 1:00 AM, etc., through 11:00 PM. The time variation is, in some implementations, a variation that is less than the minimum time period, for example, less than one hour.

To determine the schedule time, the time variation, in some implementations, is added to (or, alternatively subtracted from) the schedule time. The variation, in some implementations, is determined from the first time by removing the hours time. For example, if the first time is 1:44:30 PM, then the variation is 44:30. Thus, if the schedule time is 3:00 PM, then the scheduled execution time is 3:44:30 PM. Accordingly, the rule is executed daily at 3:44:30 PM.

Overlapping Entity Detection

Because an account may have multiple rules enable for its one or more associated advertising campaigns, it is possible that two or more rules may operate on the same campaign management entity. When a two or more rules operate on the same campaign management entity, the rules are considered to overlap in affected entities. This can lead to unexpected results, and a user, without knowledge of the overlapping entities, may have a difficult time when troubleshooting the rules to determine why the rules are not producing the results she or he expects.

In general, the scripting system 118 performs an overlapping entity detection for a candidate rule for a particular account against all existing active rules in the account and returns the result. When a rule is first defined by a user, the scripting system 118 designates the rule as a candidate rule. Candidate rules are rules that have not been accepted for use in automated management of an advertising campaign, and are checked for overlapping entity detection prior to acceptance.

The result of the detection includes an enumerated type indicated whether or not any overlapping entities have been found. In some implementations, the enumerated types include "OVERLAP," "NO OVERLAP," and "MAY OVERLAP." In the case of "MAY OVERLAP," the system 118 may not be able to determine with certainty whether two rules overlap, e.g., the rules may include filters that are evaluated at run time, and the filter results may vary. Thus, unless the filters are mutually exclusive, the system 118 determines that some of the advertisement entities may overlap. The result can also include the rules that overlap with the candidate rule, and examples of the entities that are affected by both rules. The following criteria will be used to determine whether two rules have the same entities.

FIG. 7A is an example user interface 700 for campaign rules 702 and 704 that includes an overlapping entity detection notice 706. As illustrated in FIG. 7, the rule 702 is an accepted rule, with a status of Green, indicating the rule is enabled. The rule 704 is a candidate rules, as indicated by the "Candidate" status.

The user interface 700 includes a notification 706 that identifies the two rules as conflicting (i.e., the entities their respective operations affect are overlapping). According to the descriptions for both rules, both have the same requirements (CTR<2%), and both rules are for the same ad groups and keywords. Accordingly, the rules are determined to overlap, as indicated by the notification 706.

The notification 706, in some implementations, includes and "Accept" link that the user can select to accept the rules as they are. Alternatively, user can select one of the listed rules to instantiate a rule editing interface to change rule parameters of the selected rule and resolve the conflict.

Figure 7B:
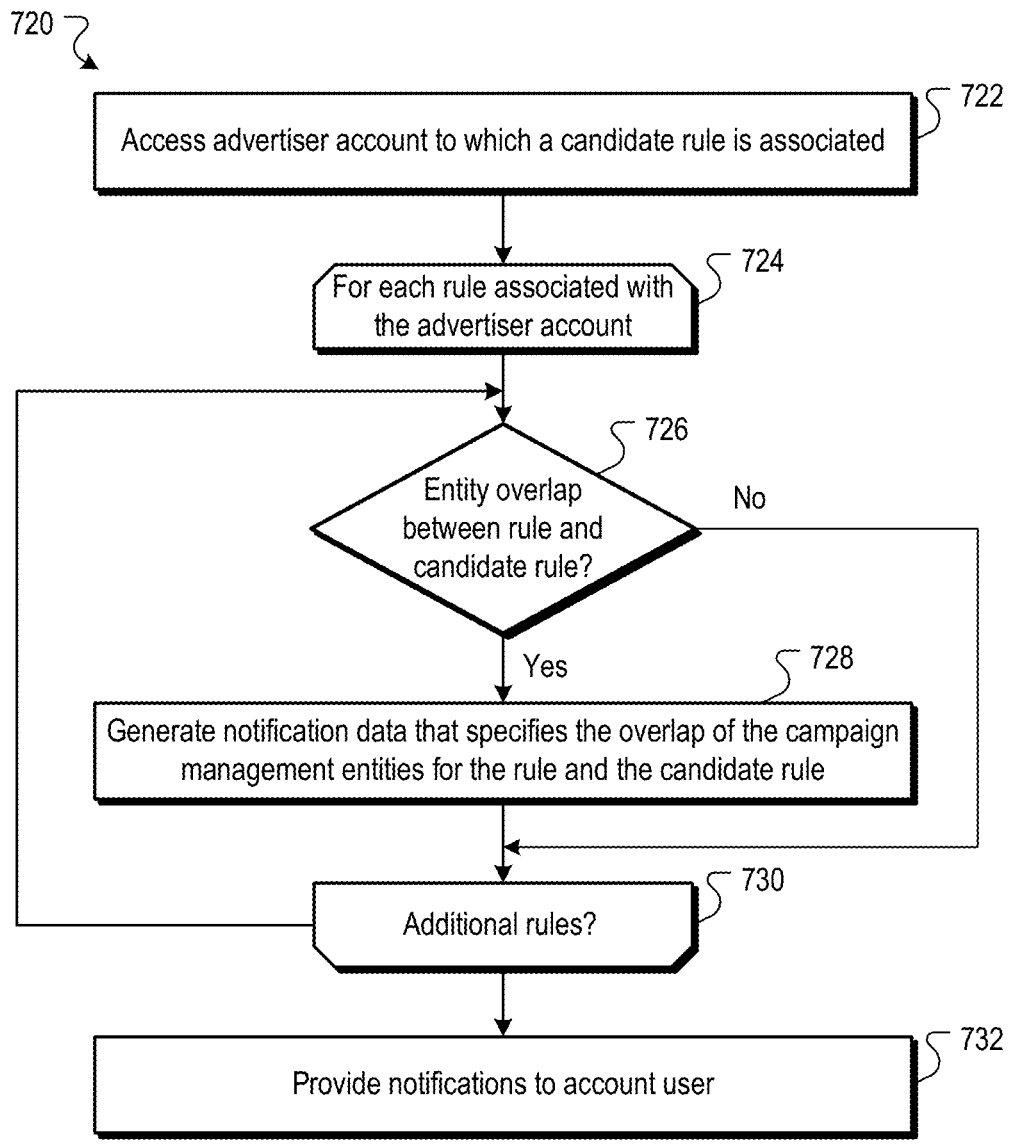
FIGS. 7B and 7C are flow diagrams of example processes for detecting overlapping entities between a candidate rule and other campaign rules.
Figure 7C:
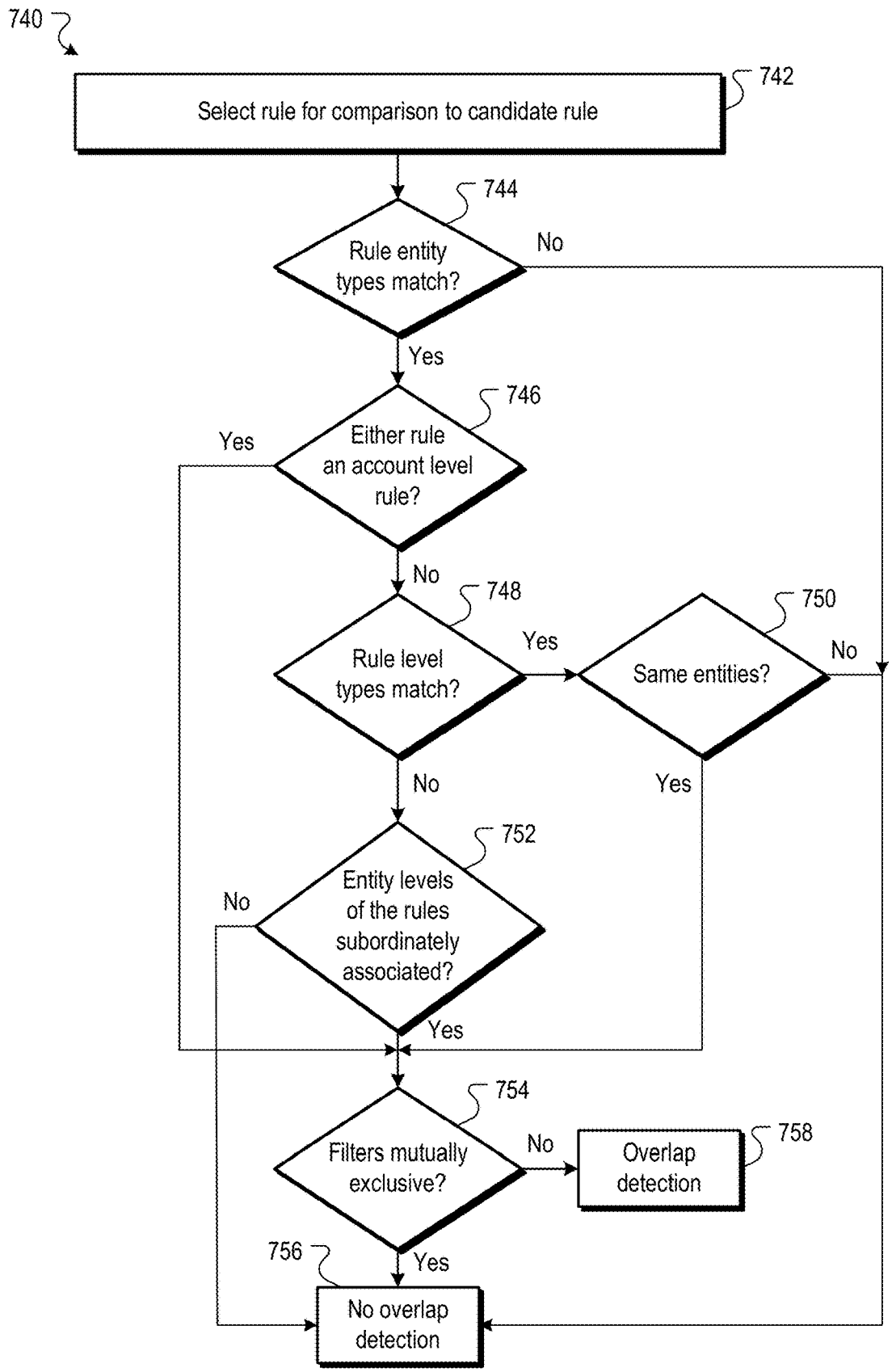

To determine whether entities between a candidate rule and other rules overlap, the scripting system 118 executes the example processes 720 and 740 respectively depicted in FIGS. 7B and 7C.

With respect to FIG. 7B, the process 720 accesses an advertiser account to which a candidate rule is associated (722), and then accesses each accepted rule associated with the advertiser account (724). For example, when a user of a particular account has generated a candidate rule, the system 118 checks the candidate rule against all other accepted rules associated with the particular advertiser account.

For each accepted rule, the process 720 determines if there is an entity overlap between the rule and the candidate rule (726). An example process for determining an entity overlap is described with reference to FIG. 7C below.

If the process 720 determines there is an entity overlap between the rule and the candidate rule, the process generates notification data that specifies the overlap of the campaign management entities for the rule and the candidate rule (728).

After generation the notification data, or after the process determines there is not an overlap, the process 720 determines if any additional rules remain to be processed (730). If addition rules remain to be process, the next rule is selected and an overlapping entity check is performed for the next rule and the candidate rule.

If, however, no rules remain to be processed, then the process 720 provides the notifications to the account user (732). For example, in FIG. 7A, the system 118 has detected one rule with overlapping entities and the notification data is provided in the form of the overlapping entity detection notice 706.

The process 740 of FIG. 7C is an example process for determining an entity overlap. In operation, the process 740 selects a rule for comparison to the candidate rule (742). The process 740 first determines if the rule entity types of the rules match (744). A rule entity type describes the type of campaign management entities for which an entity change is specified by the rule. For example, a first rule may have a rule entity type of "Campaigns," which means that the operation affects entities at the advertising campaign level (e.g., such as the "Pause Campaigns" rule being edited as depicted in FIG. 5). Likewise, a second rule may have a rule entity type of "Ad Groups", which means that the operation affects entities at the ad group level (e.g., such as the "Change ad group default max. CPC" rule being edited as depicted in FIG. 4). If the rule entity types do not match, then the process 740 determines there is no entity overlap (756). For example, because the first rule only affects advertising campaign entities, and the second rule only affects advertisement group entities, the rules are determined not to overlap.

Conversely, if the rules are of the same rule entity type, then the process 740 analyzes the rule level types to determine if the levels of the affected campaign managements overlap. A rule level type specifies the level of the campaign management entity to which the candidate rule is associated. Thus, a rule level type may be higher than the rule entity type, i.e., the campaign management entities for which an entity change is specified by the rule is at or subordinate to the campaign management entity level.

To illustrate, two rules may be of an "Ad Group" entity type, and respectively specify different ad groups. First, assume each rule also has a rule level type of "Ad Group." Accordingly, each rule only applies to one ad group, and because the ad groups are different, the rules will not overlap. Now assume the first rule applies has an account level, and thus applies to all ad groups for all campaigns associated with a particular account. The second rule has an ad group level and applies to only one ad group for one campaign in the particular account. Here, the second rule has a campaign management entity level (i.e., Ad group level) that is subordinate to the campaign management entity level (i.e., Account level) of the first rule. In such a case, there may be an entity overlap.

The level check is implemented in steps 746-752, described in more detail below.

The process 740 determines if either rule is an account level rule (746), i.e., whether either rule is has a campaign management entity level of account level. As describe above, if the rule entity types match, and one of the rules is an account level rule, then there may be an overlap.

However, if the process 740 determines that neither rule is an account level rule, then the process 740 determines whether the rule level types match (748). For example, if both rule level types are "Ad Group", then the process 740 will determine a match. Assuming a match is determined, the process then determines whether the entities for which for which the changes are specified are the same entities (750), i.e., the same instance of a particular campaign management entity. For example, if both rule level types are "Ad Group", and both rules have operations that specify changes for the same ad group (e.g., Ad Group X), then the changes are specified for the same entities, and an overlap may be present. In other words, if the first campaign management entity level of a first rule and the second campaign management entity level of a second rule are the same and subordinate to the account level, and the respective campaign management entities for which entity changes are specified are the same, then there may be an overlap. Conversely, if the entities for which for which the changes are specified not are the same entities (e.g., Ad Group X for the first rule, and Ad Group Y for the second rule), then the process 740 determines there is no entity overlap (756).

If, however, the process 740 determines that the rule level types do not match, then the process 740 determines whether the campaign management entity levels to which the rules are respectively associated are subordinately associated by the affected entities (752). For example, assume a first rule affects all ad groups (Ad Group 1 and Ad Group 2) for a particular campaign (Campaign 1). The first rule thus has a rule entity type of Ad Group, and an entity level of Campaign. A second rule affects only one ad group—Ad Group 1. The second rule thus has a rule entity type of Ad Group, and an entity level of Ad Group. The rules are also subordinately associated by the affected entities because Ad Group 1, affected by both rules, belongs to Campaign 1. Accordingly, there may be an entity overlap.

Conversely, if the first rule affects all ad groups associated with a different campaign—Campaign 2—then the rules would not be subordinately associated by the affected entities, as Ad Group 1 belongs to Campaign 1, and not Campaign 2. The process would then determine there is no entity overlap (756)

If the process 740 has a positive determination to any of process steps 746, 750 or 752, then the process 740 determines if the rules have filters that are mutually exclusive (754). For example, if an entity filter is applied in the first rule that filters campaigns with a budget more than $5,000, and an entity filter is applied in the second rule that filters campaigns with a budget of less than $4,000, then the filter are mutually exclusive such that they cannot be true (or provide a same result element) at the same time.

If the filters are mutually exclusive, then the process 740 determines that there is no entity overlap. Otherwise, if the filters are not mutually exclusive, or the entities for one or both rules are not subject to filtering, then the process 740 determines there is an entity overlap (758).

In a variation of this implementation, the process 740 may return a "MAY OVERLAP" value if the rules include filters that are evaluated at run time and that are not mutually exclusive. This is because an overlap may or may not occur, depending on the filter parameters. For example, if the filter parameters are based on remaining budget to be spent, then the result can be "MAY OVERLAP", as the remaining budgets to be spent will vary each day.

In some implementations, the scripting system 118 can also take into account time based aspects of rules as an additional overlap signal. One decision process that the scripting system 118 can implement is that two (or more) rules that are configured to execute at different times but that affect the same entities, e.g., the two rules include the same logic for selecting entities or the specify the same entities, do not overlap. For example, a first rule may pause an advertising campaign at midnight, and a second rule may enable the same advertising campaign at 8:00 AM. The two rule affect the same entities but do not overlap as they take effect at different times. Alternatively, the system 118 may be configured to identify that the two rules that affect the same entities may overlap, so that the rules are presented to the user in a user interface and the user may make additional edits or accept the rules.

In a variation of this implementation, the scripting system 118 may include logic that requires that the two rules that affect the same entities must not execute within a predefined time window of each other to not overlap. For example, assume the predefined time window is 30 minutes. A first rule pauses an advertising campaign at 3:00 PM, and a second rule enables the same advertising campaign at 3:05 PM. Here, the scripting system 118 will detect an overlap, as the pausing and enabling of an advertising campaign within a five minute window may be the result of an oversight on the part of the user, e.g., the user is unaware of one of the two rules, or the user entered an incorrect time value.

Script Batching

The scripting engine 118, in some implementations, may have timing and resource limitations that are imposed for each execution of a rule. For example, the system 118 may have a total rule execution time limit of n hours (e.g., n=1, 2, 3 hours, etc.); and each instance of an execution of a script may have a different time limit, e.g., of m minutes. Other resource constraints may also be imposed.

Thus, in some implementations, the script system 118 partitions campaign entities into subsets, and instantiates, for each subset, a separate execution fragment in which the operation is executed on only the subset to change the campaign management entities that belong to the subset according to the specified campaign entity change. The size of each subset is selected so that the execution of each subset complies with the constraints imposed on each script execution, and the execution of all subsets complies with constraints imposed for each execution of a rule.

Figure 8A:
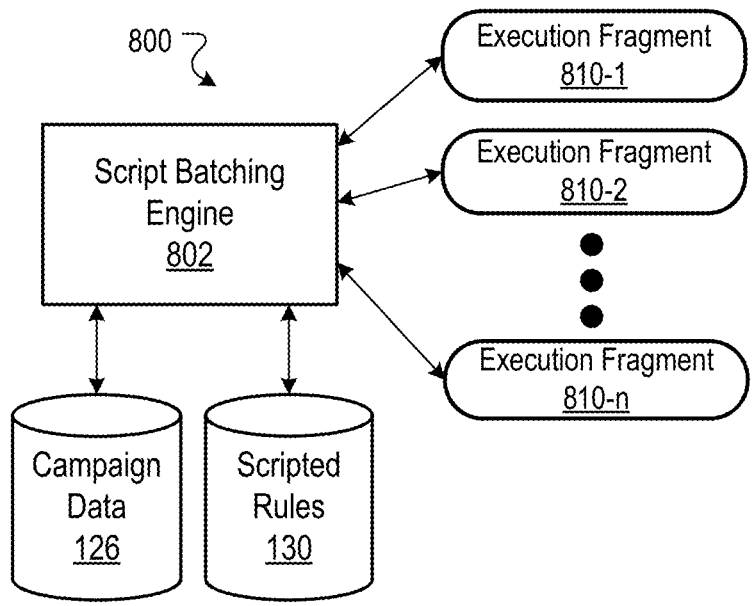
FIG. 8A is a block diagram of example system for partitioning the execution of a script into batches.
Figure 8B:
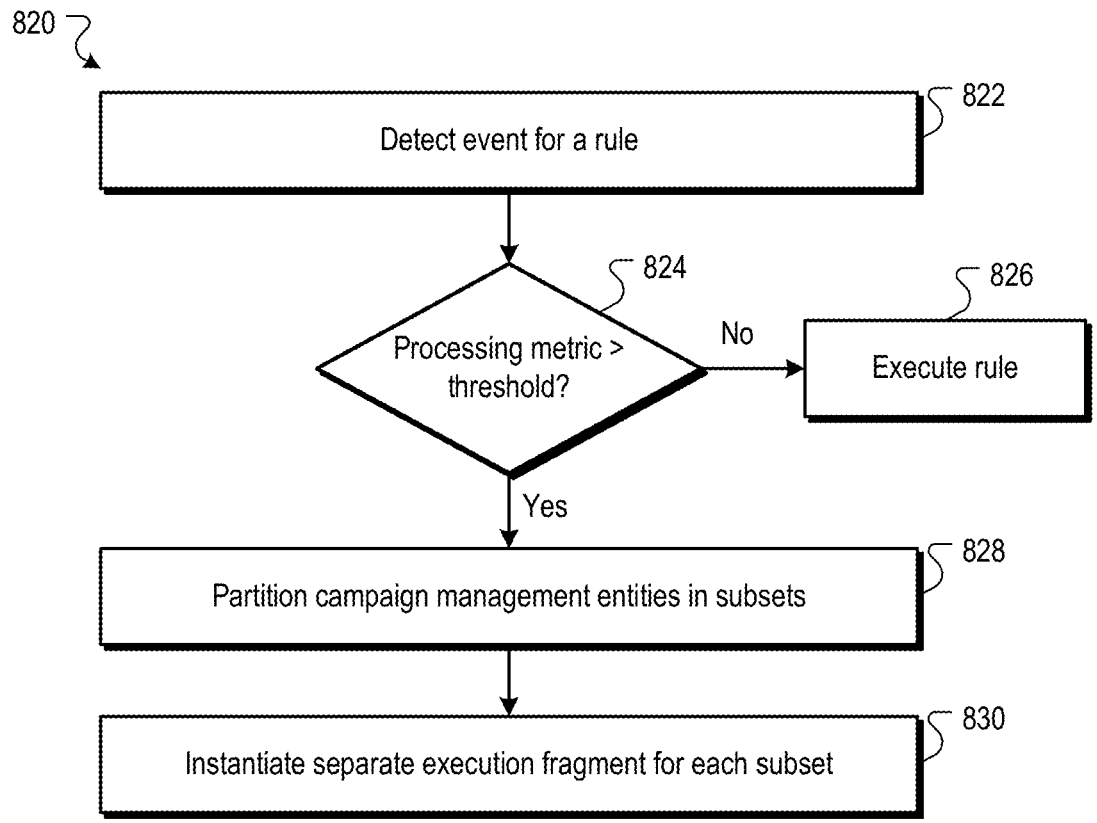
FIG. 8B is a flow diagram of an example process for partitioning the execution of a script into batches.

FIG. 8A is a block diagram of example system 800 for partitioning the execution of a script into batches. Operation of the example system 800 is described with reference to FIG. 8B, which is a flow diagram of an example process 820 for partitioning the execution of a script into batches.

When the script system 118 detects an event for a rule (822), the script system 118 invokes the script batching engine 802 to determine whether the campaign management entities affected by the operation of the rule should be partitioned into subsets. In some implementations, the script batching engine 802 determines whether a processing metric exceeds a threshold (824). If the processing metric does not exceed the threshold, the script engine 118 executes the rule (826) without fragmenting.

There are varieties of ways in which the script batching engine 802 can determine whether a processing metric exceeds a threshold. For example, the script batching engine 802 may determine whether a number of campaign management entities for which an entity change is specified exceeds a maximum number. In some implementations, each of the campaign management entities has a corresponding maximum number based on its respective entity type, and the script batching engine 802 determines whether the number of campaign management entities for which an entity change is specified exceeds the corresponding maximum number of the respective entity type of campaign management entities. To illustrate, assume that a maximum number of entities in a fragment must not exceed X, and a different value of X is picked for each entity type (campaigns, ad groups, keywords, etc.). Accordingly, no more than 5000 keyword campaign entities can be handled by any particular execution fragment; no more than 500 ad group campaign entities can be handled by any particular execution fragment; and so on.

By way of another example, the script batching engine 802 can determine whether a processing time required to process the changes of the campaign management entities exceeds a maximum processing time. The script batching engine 802 can partition the campaign management entities into subsets so that, for each of the subsets, a respective processing time required to process the changes of the campaign management entities is less than the maximum processing time. The number of campaign management entities for each fragment may depend on observed performance of previously executed fragments.

If the script batching engine 802 determines that the processing metric does exceed the threshold, then the script batching engine partitions the campaign management entities into subsets (828), and then instantiates a separate execution fragment 810-1, 810-2, or 810-n for each subset (830). For example, the script batching engine 802 can partition the campaign management entities into subsets that each have a cardinality that is less than the respective maximum number associated with the campaign management entity, or can partition the campaign management entities so that the execution of any one fragment does not exceed a maximum processing time.

In some implementations, the script batching engine 802 instantiates execution fragments for subsets of campaign management entities that are subordinate to a same campaign entity in a hierarchy in serial, and instantiates execution fragments for subsets of campaign management entities that respectively subordinate to different campaign entity in parallel. For example, subsets of entities belonging to different ad groups may be processed in parallel, while subsets of entities belonging to the same ad group may only be processed in serial.

In some implementations, the script batching engine 802 partitions the campaign management entities into subsets of campaign management entities that are subordinate to different campaign entities in the hierarchy so that, for each subset, a number of different campaign entities to which the campaign management entities that belong to the subset are subordinate is less than a maximum threshold. For example, the script batching engine 802 may be required to ensure that the total number of ad groups to which the entities in a fragment belong must not exceed a maximum value Y. To illustrate, assume Y is 1,000. Thus, sending 5,000 keywords that belong to the same ad group to one execution fragment group is acceptable, but sending 5,000 keywords that belong to 2,000 different ad groups is not acceptable. Accordingly, in the latter case, the script batching engine will partition the keywords into, for example, 2,000 keywords within 1,000 ad groups and 3,000 keywords within the other 1,000 ad groups.

In some implementations, the script batching engine 802 determines, for each separate execution fragment, an error status for the execution fragment that indicates whether the execution fragment executed without error, and persists changes for only execution fragments having an error status indicating the execution fragment executed without error. For example, if a change to a particular campaign entity in a particular execution fragment fails, then the entire update for the execution fragment fails. In some implementations, the script batching engine 802, in response to detecting one or more change failures in response to execution of a fragment, removes the campaign management entities for which the changes failed from the subset and re-executes the execution fragment 810 on the modified subset. Provided there are no failures, the changes are persisted to the campaign data.

Parallelization Constraints

In some implementations, the execution fragments are instantiated according to parallelization constraints. The parallelization constraints ensure that any one rule and/or the rules of any one entity do not exceed a maximum resource demand and any one time. Accordingly, should one advertiser have an associated rule that is resource intensive, the execution of the operations of the rule will not impact the performance as seen by other advertisers.

One example parallelization constraint is an allocation limit of separate execution fragments. The allocation limit specifies a quantity of separate execution fragments that can be executing in parallel at any one time for any one rule. The allocation limit is also less than a maximum number of separate execution fragments that the data processing apparatus in which the scripting system 118 is implemented can process at any one time. For example, assume that the allocation limit is 100, and that a particular rule has 1000 subsets of campaign management entities for the rule. Accordingly, only 100 execution fragments can be instantiated at any one time for the 1000 subsets for the rule.

In some implementations, the allocation limit can be for an account level, and thus specifies a quantity of separate execution fragments that can be executing in parallel at any one time for any one account. For example, assume one particular account has three rules that are being executed, and the first rule has 1200 subsets, the second rule has 2100 subsets, and the third rule has 800 subsets. In the allocation limit of 100 were applied on a per-rule basis, a particular account could have up to 300 execution fragments instantiated at any one time. Accordingly, by applying an allocation limit on a per-account basis, rules for one particular advertiser cannot be allocated so many resources that execution of rules for other advertiser is impacted.

In some implementations, there can be a per-rule allocation limit and a per-account allocation limit, where the per-account allocation limit is greater than the per-rule allocation limit.

Another example parallelization constraint is a pipeline schedule. A pipeline schedule specifies instantiation slots (e.g., time slots) during which a separate execution fragment for an operation of a rule can be instantiated. The pipeline schedule allows for processing a subsets of multiple advertisers in a manner that ensures that respective subset queues for each advertiser are at least periodically serviced in a timely manner.

Figure 9A:
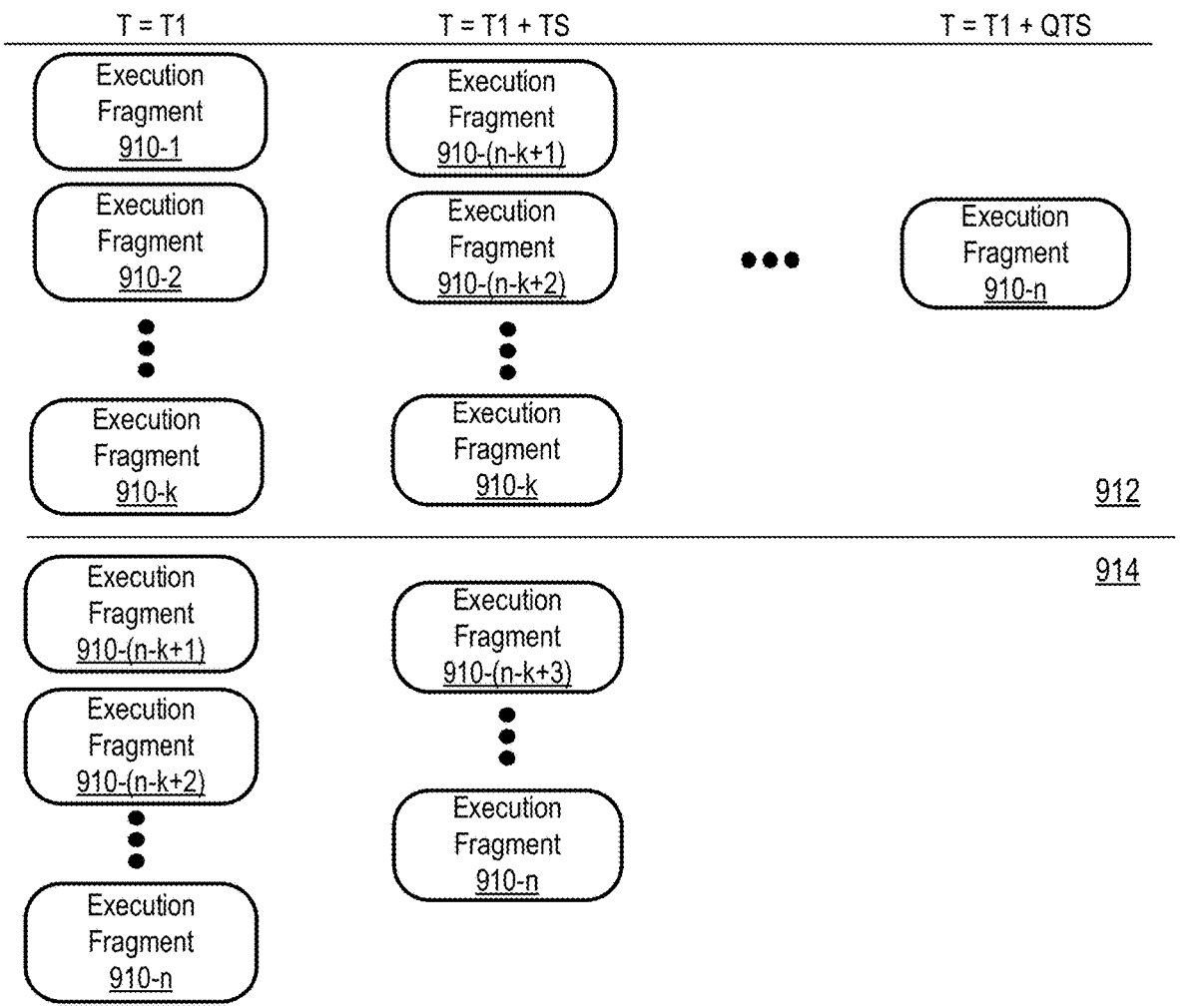
FIG. 9A is a block diagram illustrating an instantiation timeline for execution fragments wherein the instantiations are subject to parallelization constraints.

The scripting system 118 can use one or both of an allocation limit and pipeline schedule. FIG. 9A is a block diagram illustrating an instantiation timeline 900 for execution fragments 910 wherein the instantiations are subject to both parallelization constraints. The fragments 910 are for one particular advertiser. Here, the advertiser, by use of one or more rules, has n entity subsets for which n execution fragments (910-1 . . . 910-n) must be instantiated. The allocation limit k is less than n.

According to a pipeline schedule, execution fragments can be instantiated for the particular advertiser during slots T1, T1+TS . . . T1+Q*TS. At the time T=T1, the up to k execution fragments are instantiated, as show in the left most of region 912. The execution fragments 910-(n-k+1) . . . 910-n remain to be instantiated, as shown in the left most portion of region 914.

At a time T=T1+TS, the execution fragments 910-1 and 910-2 are completed, while the remaining execution fragments are being processed. Accordingly, the two more execution fragments are instantiated. Accordingly, the system 118 maintains up to the allocation limit of separate execution fragments executing in parallel at any one time until a separate execution fragment has been instantiated for each subset. Thus, at a time T=T1+QS, where Q is equal to at least n/k, all but the last execution fragment have been instantiated and completed, and the last execution fragment 910-n is instantiated.

Figure 9B:
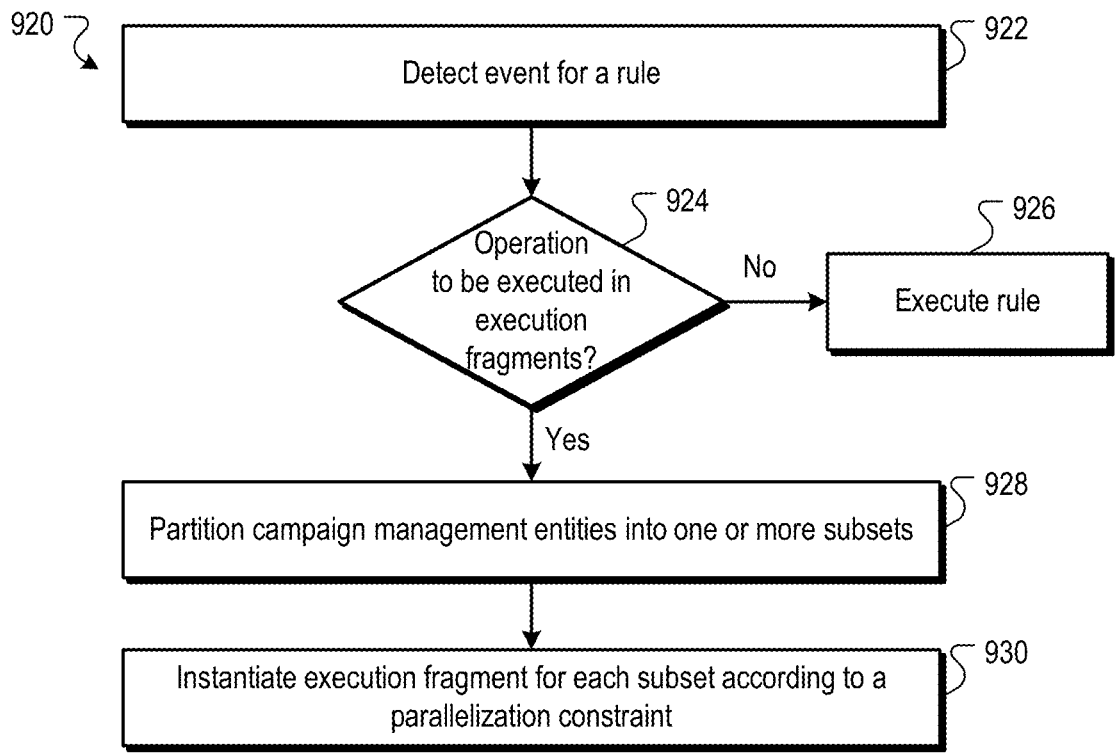
FIGS. 9B and 9C are flow diagrams of example processes for instantiating execution fragments according to parallelization constraints.
Figure 9C:
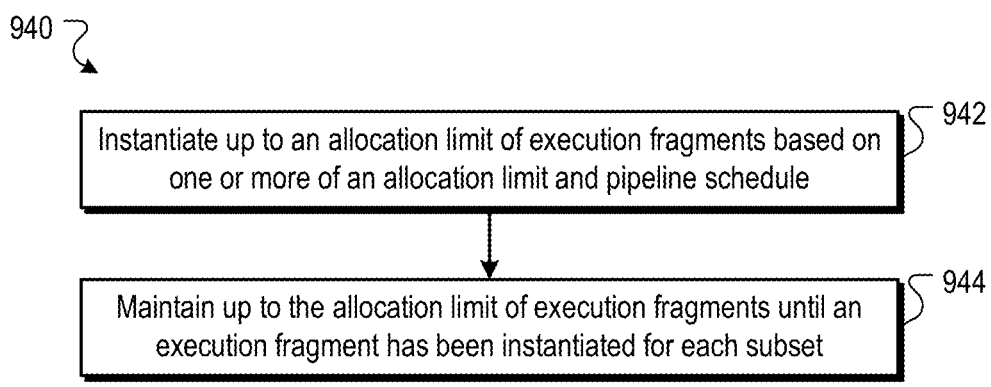

FIGS. 9B and 9C are flow diagrams of example processes for instantiating execution fragments according to parallelization constraints. The process 920 detects an event for a rule (922), and in response determines whether the operation of the rule is to be executed in execution fragments (924). For example, the process as described in FIG. 8B can be used to determine whether separate execution fragments should be executed.

If the process 920 determines that the operation is not to be executed in separate execution fragments, the process 920 then executes the operation associated with the event by the rule (926). This causes one or more changes to the campaign management entities according to the specified campaign entity change of the operation.

Conversely, if the process 920 determines that the operation is not to be executed in separate execution fragments, the process 920 partitions the campaign management entities for which an entity change is specified into one or more subsets (928). The partitioning into subsets can be as described with reference to FIGS. 8A and 8B above.

The process 920 then instantiates a separate execution fragment for each subset according to a parallelization constraint (930). The parallelization constraint defines a maximum resource allocation for instantiations of separate execution fragments for the rule and/or account. For each separate execution fragment, the operation is executed on only the subset to change the campaign management entities that belong to the subset according to the specified campaign entity change.

In the case of a per-account allocation limit, the scripting system 118 identifies an account entity associated with the rule, and determines a current resource allocation specifying a quantity of separate execution fragments for all other operations defined by other rules associated with the account entity. If the total number of instantiated execution fragments meets the allocation limit, then the system 118 determines that the operation is to be executed in one (or more) execution fragments. This ensures that the operations that can be executed in a single execution fragment do not result in a resource allocation "leak," i.e., when an account has at least one execution fragment instantiated, then all other execution fragments are and the currently instantiated execution fragment are subject to parallelization constraints.

The process 940 is one example by which execution fragments are instantiated according to one or more parallelization constraints. For example, the process 940 instantiates up to an allocation limit of execution fragments based on one or more of an allocation limit and pipeline schedule (942). For example, the allocation limit specifies a quantity of separate execution fragments that can be executing in parallel at any one time for the operation and all other operations defined by other rules associated with the account entity, and the quantity is less than a maximum number of separate execution fragments that the system can process at any one time. For example, the quantity may be capped to a certain number, e.g., 100, or derived from a percentage of resource allocation, e.g., 0.1% of total available resources. Likewise, the instantiations may only occur according to a pipeline schedule that specifies instantiation slots during which a separate execution fragment for the operation (or account) can be instantiated. The specified instantiation slots are less than a maximum number of instantiation slots that the system 118 can handle.

The process 940 then maintains up to the allocation limit of execution fragments until an execution fragment has been instantiated for each subset (944). For example, after the initial instantiation of execution fragments, whenever an execution fragment is completed, the process 940 will check to determine in additional subsets of entities remain to be processed. If so, an additional execution fragment will be instantiated so that up to the allocation limit of execution fragments are maintained. If the instantiations are subject to a pipeline schedule, then the system 118 only instantiates the next execution fragments during the instantiation slots allocated to the rule or account.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 10:
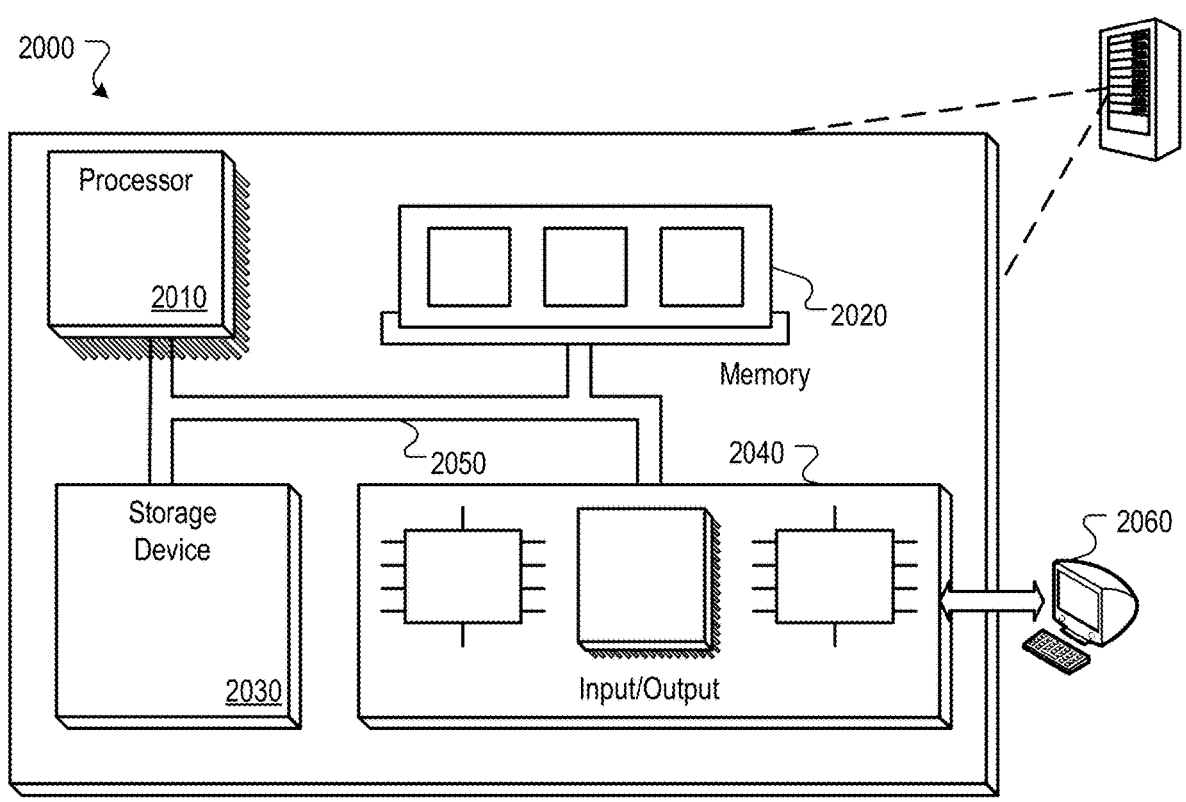
FIG. 10 is a block diagram of a data processing apparatus system.

An example of computing system in which the above-described techniques can be implemented is shown in FIG. 10, which shows a block diagram of a data processing apparatus system. The system 2000 can be utilized to implement the systems and methods described herein. The architecture of the system 2000 can, for example, be used to implement a computer client, a computer server, or some other computer device.

The system 2000 includes a processor 2010, a memory 2020, a storage device 2030, and an input/output device 2040. Each of the components 2010, 2020, 2030, and 2040 can, for example, be interconnected using a system bus 2050. The processor 2010 is capable of processing instructions for execution within the system 2000. In one implementation, the processor 2010 is a single-threaded processor. In another implementation, the processor 2010 is a multi-threaded processor. The processor 2010 is capable of processing instructions stored in the memory 2020 or on the storage device 2030.

The memory 2020 stores information within the system 2000. In one implementation, the memory 2020 is a computer-readable medium. In one implementation, the memory 2020 is a volatile memory unit. In another implementation, the memory 2020 is a non-volatile memory unit.

The storage device 2030 is capable of providing mass storage for the system 2000. In one implementation, the storage device 2030 is a computer-readable medium. In various different implementations, the storage device 2030 can, for example, include a hard disk device, an optical disk device, or some other large capacity storage device.

The input/output device 2040 provides input/output operations for the system 2000. In one implementation, the input/output device 2040 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 2060.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system for distributing execution times of scheduled rules to reduce spikes in resources used to execute the rules, the system comprising:
   a data processing apparatus including one or more computers; and
   a computer storage system storing instructions that when executed by the data processing apparatus cause the data processing apparatus to perform actions comprising:
      accessing rules associated with one or more campaign management entities;
      receiving, for each rule, a selected execution time for the rule, the selected execution time for each given rule specifying a time at which the rule is to be executed;
      identifying two or more rules that have a matching selected execution time;
      reducing spikes in resources used to execute the two or more rules, including varying scheduled execution times for the two or more rules over a time period so that a first portion of the two or more rules is executed at a different time than a second portion of the two or more rules, the varying comprising:
         for each given rule of the two or more rules:
            determining, for the given rule, a time variation that is based on a difference between (i) a pre-specified reference time and (ii) a particular time at which the selected execution time for the given rule was received;
            determining, for the given rule, a scheduled execution time based on (i) the selected execution time for the given rule and (ii) the time variation for the given rule; and
            associating the scheduled execution time with the given rule; and
      executing each given rule when a current time is equal to the scheduled execution time for the given rule.

2. The system of claim 1, wherein determining, for the given rule, a scheduled execution time based on (i) the selected execution time for the given rule and (ii) the time variation for the given rule comprises:
   adjusting the selected execution time by the time variation to determine the scheduled execution time.

3. The system of claim 2, wherein:
   the selected execution time is one of a plurality of schedule times, each of the schedule times differing from each other schedule times by at least a minimum time period; and
   determining the time variation comprises determining a time variation that defines a time period that is less than the minimum time period.

4. The system of claim 3, wherein adjusting the selected execution time by the time variation to determine the scheduled execution time comprises adding the time variation to the selected execution time.

5. The system of claim 3, wherein adjusting the selected execution time by the time variation to determine the scheduled execution time comprises subtracting the time variation from the selected execution time.

6. The system of claim 3, wherein the minimum time period is one hour, and each of the schedule times is an hours time.

7. The system of claim 6, wherein determining the time variation comprises:
   determining a current minutes value from the particular time at which the selected execution time for the given rule was received, wherein the particular time defines a time in hours and minutes.

8. The system of claim 2, wherein determining the time variation comprises:
   determining a current minutes value from the particular time at which the selected execution time for the given rule was received, wherein the particular time defines a time in hours and minutes.

9. A non-transitory computer storage medium storing instructions for distributing execution times of schedule rules to reduce spikes in resources used to execute the rules, the instructions being executable by a data processing apparatus and that upon such execution cause the data processing apparatus to perform operations comprising:
   accessing rules associated with one or more campaign management entities;
   receiving, for each rule, a selected execution time for the rule, the selected execution time for each given rule specifying a time at which the rule is to be executed;
   identifying two or more rules that have a matching selected execution time;
   reducing spikes in resources used to execute the two or more rules, including varying scheduled execution times for the two or more rules over a time period so that a first portion of the two or more rules is executed at a different time than a second portion of the two or more rules, the varying comprising:
      for each given rule of the two or more rules:
         determining, for the given rule, a time variation that is based on a difference between (i) a pre-specified reference time and (ii) a particular time at which the selected execution time for the given rule was received;
         determining, for the given rule, a scheduled execution time based on (i) the selected execution time for the given rule and (ii) the time variation for the given rule; and
         associating the scheduled execution time with the given rule; and
   executing each given rule when a current time is equal to the scheduled execution time for the given rule.

10. The computer storage medium of claim 9, wherein determining, for the given rule, a scheduled execution time based on (i) the selected execution time for the given rule and (ii) the time variation for the given rule comprises:
   adjusting the selected execution time by the time variation to determine the scheduled execution time.

11. The computer storage medium of claim 10, wherein:
   the selected execution time is one of a plurality of schedule times, each of the schedule times differing from each other schedule times by at least a minimum time period; and
   determining the time variation comprises determining a time variation that defines a time period that is less than the minimum time period.

12. The computer storage medium of claim 11, wherein adjusting the selected execution time by the time variation to determine the scheduled execution time comprises adding the time variation to the selected execution time.

13. The computer storage medium of claim 11, wherein adjusting the selected execution time by the time variation to determine the scheduled execution time comprises subtracting the time variation from the selected execution time.

14. The computer storage medium of claim 11, wherein the minimum time period is one hour, and each of the schedule times is an hours time.

15. The computer storage medium of claim 14, wherein determining the time variation comprises:
   determining a current minutes value from the particular time at which the selected execution time for the given rule was received, wherein the particular time defines a time in hours and minutes.

16. The computer storage medium of claim 10, wherein determining the time variation comprises:
   determining a current minutes value from the particular time at which the selected execution time for the given rule was received, wherein the particular time defines a time in hours and minutes.

17. A method for distributing execution times of scheduled rules to reduce spikes in resources used to execute the rules, comprising:
   accessing rules associated with one or more campaign management entities;
   receiving, for each rule, a selected execution time for the rule, the selected execution time for each given rule specifying a time at which the rule is to be executed;
   identifying two or more rules that have a matching selected execution time;
   reducing spikes in resources used to execute the two or more rules, including varying scheduled execution times for the two or more rules over a time period so that a first portion of the two or more rules is executed at a different time than a second portion of the two or more rules, the varying comprising:
      for each given rule of the two or more rules:
         determining, for the given rule, a time variation that is based on a difference between (i) a pre-specified reference time and (ii) a particular time at which the selected execution time for the given rule was received;
         determining, for the given rule, a scheduled execution time based on (i) the selected execution time for the given rule and (ii) the time variation for the given rule;
   associating the scheduled execution time with the given rule; and
   executing each given rule when a current time is equal to the scheduled execution time for the given rule.

18. The method of claim 17, wherein determining, for the given rule, a scheduled execution time based on (i) the selected execution time for the given rule and (ii) the time variation for the given rule comprises:
   adjusting the selected execution time by the time variation to determine the scheduled execution time.

19. The method of claim 18, wherein:
   the selected execution time is one of a plurality of schedule times, each of the schedule times differing from each other schedule times by at least a minimum time period; and
   determining the time variation comprises determining a time variation that defines a time period that is less than the minimum time period.

20. The method of claim 19, wherein adjusting the selected execution time by the time variation to determine the scheduled execution time comprises adding the time variation to the selected execution time.

21. The method of claim 19, wherein adjusting the selected execution time by the time variation to determine the scheduled execution time comprises subtracting the time variation from the selected execution time.

22. The method of claim 19, wherein the minimum time period is one hour, and each of the schedule times is an hours time.

23. The method of claim 22, wherein determining the time variation comprises:
   determining a current minutes value from the particular time at which the selected execution time for the given rule was received, wherein the particular time defines a time in hours and minutes.

24. The method of claim 17, wherein determining the time variation comprises:
   determining a current minutes value from the particular time at which the selected execution time for the given rule was received, wherein the particular time defines a time in hours and minutes.

25. A system for distributing execution times of scheduled rules to reduce spikes in resources used to execute the rules, the system comprising:
   a data processing apparatus including one or more computers; and
   a computer storage system storing instructions that when executed by the data processing apparatus cause the data processing apparatus to perform actions comprising:
      accessing rules associated with one or more campaign management entities;
      receiving, for each rule, a selected execution time for the rule, the selected execution time for each given rule specifying a time at which the rule is to be executed;
      identifying two or more rules that have a matching selected execution time;
      reducing spikes in resources used to execute the two or more rules, including varying scheduled execution times for the two or more rules over a time period so that a first portion of the two or more rules is executed at a different time than a second portion of the two or more rules, the varying comprising:
         for each given rule of the two or more rules:
            determining, for the given rule, a time variation that is based on a particular time at which the selected execution time for the given rule was received, including:
               identifying a minutes value of the particular time; and
               assigning the minutes value as the time variation;
            determining, for the given rule, a scheduled execution time based on (i) the selected execution time for the given rule and (ii) the time variation for the given rule; and
            associating the scheduled execution time with the given rule; and
      executing each given rule when a current time is equal to the scheduled execution time for the given rule.

26. The system of claim 25, wherein the scheduled execution time comprises a sum of the selected execution time and the minutes value.

* * * * *